US009306720B2

(12) United States Patent (10) Patent No.: US 9,306,720 B2
Takeda et al. (45) Date of Patent: Apr. 5, 2016

(54) CHANNEL STATE INFORMATION REPORTING METHOD, RADIO BASE STATION APPARATUS, USER TERMINAL AND RADIO COMMUNICATION SYSTEM

(75) Inventors: Kazuaki Takeda, Tokyo (JP); Tetsushi Abe, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 14/115,234

(22) PCT Filed: Feb. 17, 2012

(86) PCT No.: PCT/JP2012/053827
§ 371 (c)(1),
(2), (4) Date: Jan. 29, 2014

(87) PCT Pub. No.: WO2012/150665
PCT Pub. Date: Nov. 8, 2012

(65) Prior Publication Data
US 2014/0133418 A1    May 15, 2014

(30) Foreign Application Priority Data

May 2, 2011    (JP) ................................. 2011-103171

(51) Int. Cl.
*H04L 5/00* (2006.01)
*H04W 72/04* (2009.01)
(Continued)

(52) U.S. Cl.
CPC .............. *H04L 5/0053* (2013.01); *H04B 7/024* (2013.01); *H04B 7/0643* (2013.01); *H04L 1/003* (2013.01); *H04L 1/0026* (2013.01); *H04L 1/0027* (2013.01); *H04L 5/0035* (2013.01); *H04W 24/10* (2013.01); *H04W 72/042* (2013.01); *H04B 7/0626* (2013.01); *H04L 1/0003* (2013.01); *H04L 1/0009* (2013.01); *H04L 1/1812* (2013.01);
(Continued)

(58) Field of Classification Search
None
See application file for complete search history.

(56) References Cited

U.S. PATENT DOCUMENTS

2010/0238821 A1* 9/2010 Liu et al. .................... 370/252
2011/0199944 A1* 8/2011 Chen et al. .................. 370/280
(Continued)

OTHER PUBLICATIONS

International Search Report issued in PCT/JP2012/053827 mailed on Mar. 27, 2012 (4 pages).
(Continued)

*Primary Examiner* — Kodzovi Acolatse
(74) *Attorney, Agent, or Firm* — Osha Liang LLP

(57) ABSTRACT

The present invention is designed to flexibly report aperiodic channel state information to a plurality of radio base station apparatuses to be coordinated, even when coordinated multiple-point (CoMP) transmission/reception is performed.
A radio communication system includes: a radio base station apparatus that transmits an uplink scheduling grant, which includes a request field that requests reporting of channel state information from a user terminal, and an identification field that identifies a radio base station apparatus to which aperiodic channel state information should be reported, among a plurality of radio base station apparatuses that perform coordinated multiple-point transmission/reception, to the user terminal, via a downlink control channel; and a user terminal that estimates a channel state with respect to a radio base station apparatus that is designated by a combination of the request field and the identification field, and reports the channel state information to the radio base station apparatus via an uplink shared channel.

14 Claims, 12 Drawing Sheets

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

(51) Int. Cl.
  *H04B 7/02* (2006.01)
  *H04W 24/10* (2009.01)
  *H04B 7/06* (2006.01)
  *H04L 1/00* (2006.01)
  *H04L 1/18* (2006.01)

(52) U.S. Cl.
  CPC .............. *H04L5/001* (2013.01); *H04L 5/0057* (2013.01); *H04L 5/0091* (2013.01)

(56) References Cited

U.S. PATENT DOCUMENTS

| | | | | |
|---|---|---|---|---|
| 2012/0076017 | A1* | 3/2012 | Luo et al. | 370/252 |
| 2012/0250541 | A1* | 10/2012 | Ko et al. | 370/252 |
| 2013/0294352 | A1* | 11/2013 | Park et al. | 370/328 |
| 2013/0303180 | A1* | 11/2013 | Wang et al. | 455/450 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

3GPP TS 36.212 V9.3.0; "3rd Generation Partnership Project; Technical Specification Group Radio Access Network; Evolved Universal Terrestrial Radio Access (E-UTRA); Multiplexing and channel coding (Release 9)"; Sep. 2010 (61 pages).

Notification of Decision to Grant a Patent from Japanese application No. 2011-103171 dated Jun. 4, 2013 (4 pages).

Notification of Decision to Grant a Patent from Japanese application No. 2013-151519 dated Apr. 8, 2014 (4 pages).

* cited by examiner

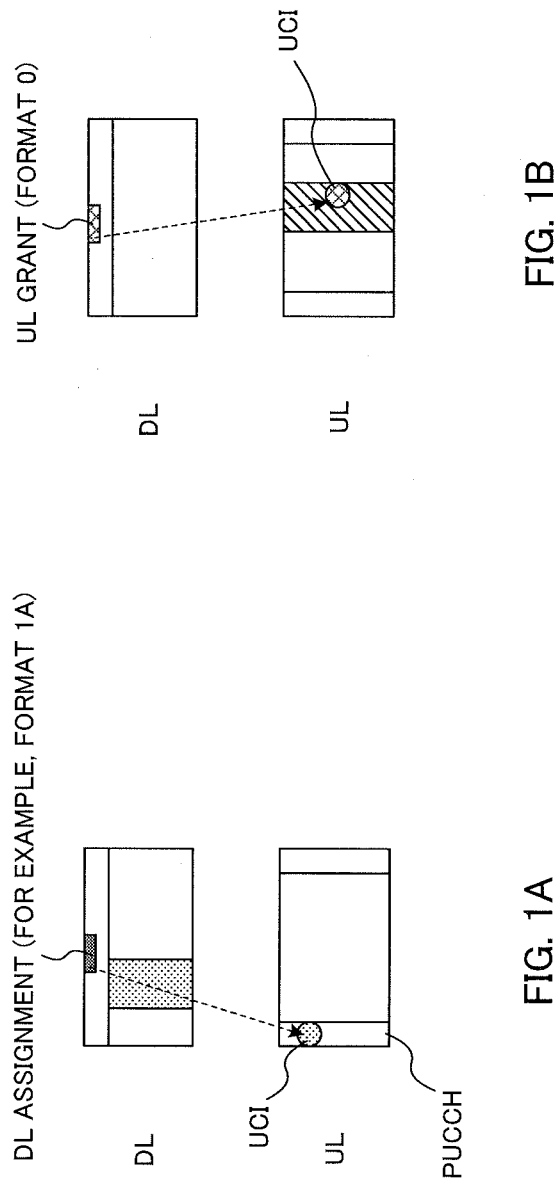

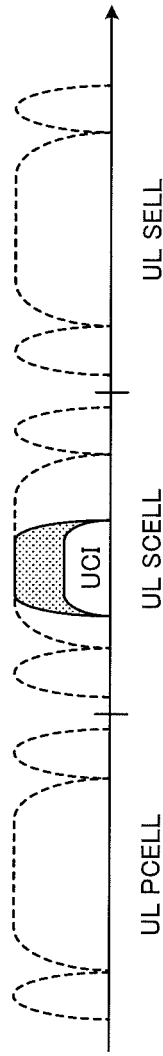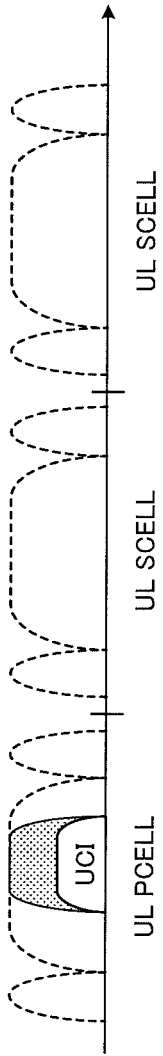

| VALUE OF CSI REQUEST FIELD | DESCRIPTION |
|---|---|
| '00' | NO CSI REPORT IS TRIGGERED |
| '01' | [CSI IS REPORTED FOR SERVING CELL] |
| '10' | CSI IS REPORTED FOR A 1ST SET OF SERVING CELLS CONFIGURED BY HIGHER LAYERS |
| '11' | CSI IS REPORTED FOR A 2ND SET OF SERVING CELLS CONFIGURED BY HIGHER LAYERS |

| VALUE OF CSI REQUEST FIELD | DESCRIPTION |
|---|---|
| '00' | NO CSI REPORT IS TRIGGERED |
| '01' | CSI IS REPORTED FOR A 1ST SET OF eNB CONFIGURED BY HIGHER LAYERS |
| '10' | CSI IS REPORTED FOR A 2ND SET OF eNB CONFIGURED BY HIGHER LAYERS |
| '11' | CSI IS REPORTED FOR A 3RD SET OF eNB CONFIGURED BY HIGHER LAYERS |

FIG. 6A

| VALUE OF CSI REQUEST FIELD | DESCRIPTION |
|---|---|
| '00' | NO CSI REPORT IS TRIGGERED |
| '01' | CSI IS REPORTED FOR SERVING CELL |
| '10' | CSI IS REPORTED FOR A 1ST SET OF eNB CONFIGURED BY HIGHER LAYERS |
| '11' | CSI IS REPORTED FOR A 2ND SET OF eNB CONFIGURED BY HIGHER LAYERS |

FIG. 6B

| VALUE OF CSI REQUEST FIELD | DESCRIPTION |
|---|---|
| '000' | NO CSI REPORT IS TRIGGERED |
| '001' | CSI IS REPORTED FOR A 1ST SET OF eNB CONFIGURED BY HIGHER LAYERS |
| '010' | CSI IS REPORTED FOR A 2ND SET OF eNB CONFIGURED BY HIGHER LAYERS |
| '011' | CSI IS REPORTED FOR A 3RD SET OF eNB CONFIGURED BY HIGHER LAYERS |
| '100' | CSI IS REPORTED FOR A 4TH SET OF eNB CONFIGURED BY HIGHER LAYERS |
| '101' | CSI IS REPORTED FOR A 5TH SET OF eNB CONFIGURED BY HIGHER LAYERS |
| '110' | CSI IS REPORTED FOR A 6TH SET OF eNB CONFIGURED BY HIGHER LAYERS |
| '111' | CSI IS REPORTED FOR A 7TH SET OF eNB CONFIGURED BY HIGHER LAYERS |

FIG. 7

| VALUE OF CSI REQUEST FIELD | VALUE OF SRS REQUEST FIELD | DESCRIPTION |
|---|---|---|
| 0 | 00 | NO CSI REPORT IS TRIGGERED |
| 0 | 01 | CSI IS REPORTED FOR A 1ST SET OF eNB CONFIGURED BY HIGHER LAYERS |
| 0 | 10 | CSI IS REPORTED FOR A 2ND SET OF eNB CONFIGURED BY HIGHER LAYERS |
| 0 | 11 | CSI IS REPORTED FOR A 3RD SET OF eNB CONFIGURED BY HIGHER LAYERS |
| 1 | 00 | CSI IS REPORTED FOR A 4TH SET OF eNB CONFIGURED BY HIGHER LAYERS |
| 1 | 01 | CSI IS REPORTED FOR A 5TH SET OF eNB CONFIGURED BY HIGHER LAYERS |
| 1 | 10 | CSI IS REPORTED FOR A 6TH SET OF eNB CONFIGURED BY HIGHER LAYERS |
| 1 | 11 | CSI IS REPORTED FOR A 7TH SET OF eNB CONFIGURED BY HIGHER LAYERS |

FIG. 8

CHANNEL STATE INFORMATION REPORTING METHOD, RADIO BASE STATION APPARATUS, USER TERMINAL AND RADIO COMMUNICATION SYSTEM

TECHNICAL FIELD

The present invention relates to a channel state information reporting method, a radio base station apparatus, a user terminal and a radio communication system in a next-generation radio communication system.

BACKGROUND ART

In the UMTS (Universal Mobile Telecommunications System) network, for the purposes of further increasing high-speed data rates, providing low delay and so on, long-term evolution (LTE) has been under study (non-patent literature 1). In LTE, as multi-access schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

In the LTE system, uplink signals are mapped to adequate radio resources and transmitted from a user terminal to a radio base station apparatus. To be more specific, uplink user data is transmitted using an uplink shared channel (PUSCH: Physical Uplink Shared Channel). Also, the PUSCH is used when uplink control information (UCI) is transmitted with uplink user data, and an uplink control channel (PUCCH: Physical Uplink Control Channel) is used when uplink control information alone is transmitted.

In uplink control information (UCI), a delivery acknowledgment (ACK/NACK) in response to a downlink shared channel (PDSCH: Physical Downlink Shared Channel)), a scheduling request, channel state information (CSI) and so on are included (see, for example, non-patent literature 2). The channel state information (hereinafter referred to as "CSI") refers to information that is based on the instantaneous downlink channel state, and includes, for example, channel quality information (CQI), the precoding matrix indicator (PMI), the rank indicator (RI) and so on. This CSI is reported from a user terminal to a radio base station apparatus periodically or aperiodically.

In response to a trigger from a radio base station apparatus, aperiodic channel state information (aperiodic CSI) is reported from a user terminal to that radio base station. This trigger (aperiodic CSI triggering) is included in an uplink scheduling grant (hereinafter referred to as "UL (uplink) grant") (DCI format 0/4) that is transmitted by a downlink control channel (PDCCH: Physical Downlink Control Channel). The user terminal reports the aperiodic channel state information (hereinafter referred to as "A-CSI") using the PUSCH designated by the UL grant, in accordance with the trigger included in the UL grant. Such reporting of A-CSI is also referred to as "aperiodic channel state information reporting" (aperiodic CSI (CQI/PMI/RI) reporting).

CITATION LIST

Non-Patent Literature

Non-Patent Literature 1: 3GPP, TR 25.912 (V7.1.0), "Feasibility study for Evolved UTRA and UTRAN," September 2006
Non-Patent Literature 2: 3GPP, TS 36.212 (V.9.3.0), "Multiplexing and channel coding," November 2010

SUMMARY OF INVENTION

Technical Problem

Now, as a promising technique to for further improving system performance in the LTE system of Release 8 (hereinafter referred to as "Rel-8"), there is inter-cell orthogonalization. In the LTE system (LTE-A system) of Release 10 (hereinafter referred to as "Rel-10") or later versions, intra-cell orthogonalization is made possible by orthogonal multiple access on both the uplink and the downlink. That is to say, on the downlink, orthogonalization is provided between user terminals (UEs: User Equipment), in the frequency domain. However, between cells, like W-CDMA, interference randomization by repeating one-cell frequency is fundamental.

In the LTE system of Release 11 (hereinafter referred to as "Rel-11") (LTE-A system) and later versions, coordinated multiple-point transmission/reception (CoMP: Coordinated Multiple-point Transmission/Reception) is under study as a technique to realize inter-cell orthogonalization. In CoMP transmission/reception, a plurality of cells (radio base station apparatuses) coordinate to perform signal processing for transmission and reception for one user terminal or a plurality of user terminals (UEs: User Equipment). To be more specific, in downlink transmission, simultaneous transmission of a plurality of cells where precoding is applied and coordinated scheduling/beam forming are under study. By means of this CoMP transmission/reception, for example, the throughput performance of user terminals located on cell edges is improved.

When CoMP transmission/reception is performed in the above LTE-A system (the LTE system of Rel-11 and later versions), the conditions of communication such as the interference level vary per cell (serving cell, coordinated cell and so on). Consequently, when the above aperiodic channel state information reporting (aperiodic CSI reporting) is performed, there is a demand to make it possible to flexibly report aperiodic channel state information (A-CSI) to a plurality of radio base station apparatuses to be coordinated.

The present invention has been made in view of the above, and it is therefore an object of the present invention to provide a channel state information reporting method, a radio base station apparatus, a user terminal and a radio communication system, whereby, even when coordinated multiple-point (CoMP) transmission/reception is performed, it is possible to flexibly report aperiodic channel state information to a plurality of radio base station apparatuses to be coordinated.

Solution to Problem

A channel state information reporting method according to the present invention includes the steps of: transmitting an uplink scheduling grant, which includes a request field that requests reporting of channel state information from a user terminal, and an identification field that identifies a radio base station apparatus to which aperiodic channel state information should be reported, among a plurality of radio base station apparatuses that perform coordinated multiple-point transmission/reception, to the user terminal, via a downlink control channel; estimating a channel state with respect to a radio base station apparatus that is designated by a combination of the request field and the identification field, in the user terminal; and reporting the channel state information to the designated radio base station apparatus via an uplink shared channel, in the user terminal.

According to the above channel state information reporting method, it is possible to designate a radio base station apparatus, to which aperiodic channel state information should be reported, in an uplink scheduling grant, so that it is possible to flexibly report the conditions of communication between each radio base station apparatus and a user terminal, such as the interference level, to a targeted radio base station apparatus. By this means, it is possible to effectively execute coordinated multiple-point transmission/reception between a plurality of radio base station apparatuses that perform coordinated multiple-point transmission/reception.

Also, a radio base station apparatus according to the present invention includes: a generating section that generates an uplink scheduling grant, which includes a request field that requests reporting of channel state information from a user terminal, and an identification field that identifies a radio base station apparatus to which aperiodic channel state information should be reported, among a plurality of radio base station apparatuses that perform coordinated multiple-point transmission/reception; and a transmission section that transmits the uplink scheduling grant to the user terminal, via a downlink control channel.

According to the above radio base station apparatus, it is possible to designate a radio base station apparatus, to which aperiodic channel state information should be reported, in an uplink scheduling grant, so that it is possible to flexibly report the conditions of communication between each radio base station apparatus and a user terminal, such as the interference level, to a targeted radio base station apparatus. By this means, it is possible to effectively execute coordinated multiple-point transmission/reception between a plurality of radio base station apparatuses that perform coordinated multiple-point transmission/reception.

A user terminal according to the present invention includes: a receiving section that receives an uplink scheduling grant, which includes a request field that requests reporting of channel state information from a user terminal, and an identification field that identifies a radio base station apparatus to which aperiodic channel state information should be reported, among a plurality of radio base station apparatuses that perform coordinated multiple-point transmission/reception, via a downlink control channel; an estimating section that estimates a channel state to be reported to the radio base station apparatus; and a transmission section that reports the channel state information to the radio base station apparatus designated by a combination of the request field and the identification field, via an uplink shared channel.

With the above user terminal, a radio base station apparatus, to which aperiodic channels state information should be reported, is designated in an uplink scheduling grant, so that it is possible to flexibly report the conditions of communication between each radio base station apparatus and a user terminal, such as the interference level, to a targeted radio base station apparatus.

A radio communication system according to the present invention includes: a radio base station apparatus that transmits an uplink scheduling grant, which includes a request field that requests reporting of channel state information from a user terminal, and an identification field that identifies a radio base station apparatus to which aperiodic channel state information should be reported, among a plurality of radio base station apparatuses that perform coordinated multiple-point transmission/reception, to the user terminal, via a downlink control channel; and a user terminal that estimates a channel state with respect to a radio base station apparatus that is designated by a combination of the request field and the identification field, and reports the channel state information to the radio base station apparatus via an uplink shared channel.

With the above radio communication system, a radio base station apparatus, to which aperiodic channels state information should be reported, is designated in an uplink scheduling grant, so that it is possible to flexibly report the conditions of communication between each radio base station apparatus and a user terminal, such as the interference level, to a targeted radio base station apparatus. By this means, it is possible to effectively execute multiple-point transmission/reception between a plurality of radio base station apparatuses that perform multiple-point transmission/reception.

Advantageous Effects of Invention

According to the present invention, even when coordinated multiple-point (CoMP) transmission/reception is performed, it is possible to flexibly report aperiodic channel state information to a plurality of radio base station apparatuses to be coordinated.

BRIEF DESCRIPTION OF DRAWINGS

FIG. 1 is a diagram to show an example of an uplink control information transmission method in an LTE system;

FIG. 2 provides diagrams to show examples of an uplink control information transmission method in an LTE-A system;

FIG. 6 provides diagrams to show examples of a CSI request field used in the channel state information reporting method according to the present embodiment;

FIG. 7 is a diagram to show examples of a CSI request field used in the channel state information reporting method according to the present embodiment;

FIG. 8 is a diagram to show examples of a CSI request field used in the channel state information reporting method according to the present embodiment;

DESCRIPTION OF EMBODIMENTS

Figure 3:
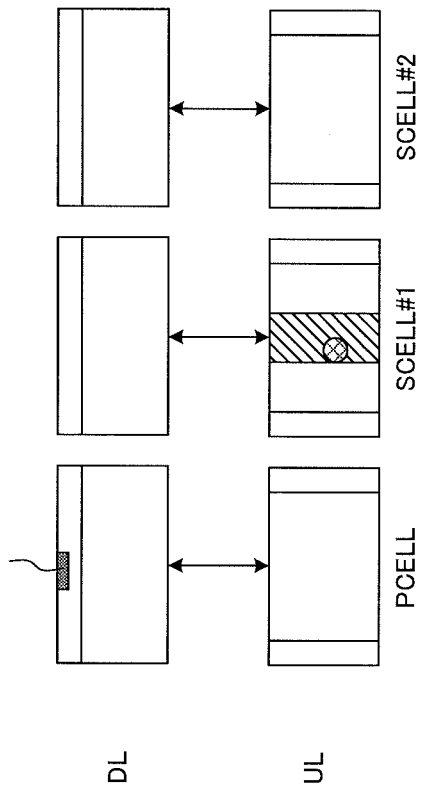
FIG. 3 is a diagram to show an example of an A-CSI transmission method in the LTE-A system (the LTE system of Rel-10 and later versions)

FIG. 1 is a diagram to show an example of an uplink control information transmission method in the LTE system. In the Rel-8 LTE system, the PUCCH (A/N, SR, periodic CSI (CQI/PMI/RI)) is used as a method of transmitting uplink control information (UCI). When uplink user data is not transmitted via the PUSCH, uplink control information (UCI) is transmitted via an uplink control channel (PUCCH) (see FIG. 1A).

Meanwhile, when an uplink scheduling grant (UL grant) (DCI format 0/4) is transmitted via a downlink control channel (PDCCH) (that is, when there is uplink user data), uplink control information (UCI) is transmitted with uplink user data via the uplink shared channel (PUSCH) designated by the UL grant (see FIG. 1B).

For example, since a trigger for aperiodic channel state information reporting (hereinafter referred to as "A-CSI trigger") is included in the UL grant (DCI format 0/4), aperiodic channel state information (A-CSI), which is one type of uplink control information (UCI), is always transmitted via the PUSCH that is associated with that UL grant.

In the LTE-A system, which is a successor system of the LTE system, it is preferable to realize broadbandization while maintaining backward compatibility with the LTE system. So, in the LTE-A system, using fundamental frequency blocks (component carriers (CCs)) having a band which can be used in the LTE system (for example, 20 MHz) and combining a plurality of component carriers to realize broadbandization (for example, 100 MHz, if five CCs are combined), are under study (carrier aggregation).

FIG. 2 is a diagram to show an example of an uplink control information transmission method in the LTE-A system. In the Rel-10 LTE-A system, broadbandization is made possible by combining a plurality of component carriers (CCs), so that a user terminal is configured to be able to communicate in a plurality of serving cells of different component carriers. Meanwhile, in uplink transmission in the LTE-A system, application of the SC-FDMA radio access scheme is under study. Consequently, in uplink transmission, it is preferable to transmit from a single CC (that is, from a single serving cell) in order to maintain the characteristics of uplink single-carrier transmission.

When uplink transmission is carried out by a single CC, to transmit uplink control information (UCI), selecting the serving cell of a specific CC is requested. For example, when UCI is transmitted via the PUCCH, the serving cell of the PCC (Primary Component Carrier), by which the PUCCH is transmitted, is selected. On the other hand, when UCI is transmitted via the PUSCH with user data, the serving cell of the CC associated with PUSCH designated by the UL grant is selected.

To be more specific, as shown in FIG. 2A, when reporting of A-CSI from a user terminal is requested (when an A-CSI trigger is included in a UL grant), the serving cell of an SCC (Secondary Component Carrier) (also referred to as "S cell") that is associated with that UL grant is selected, and, using the selected SCC, UCI including A-CSI is transmitted. On the other hand, as shown in FIG. 2B, when reporting of A-CSI from a user terminal is not requested, the serving cell of the PCC (also referred to as "P cell") is selected, and, using the selected P cell, UCI is transmitted.

FIG. 3 is a diagram to show an example of an A-CSI transmission method in the LTE-A system (the LTE system of Rel-10 and later versions). As shown in FIG. 3, to designate at least one downlink serving cell on the network side, it may be possible to add bit information that designates a predetermined serving cell, in addition to an A-CSI trigger, in a UL grant (DCI format 0/4). For example, as shown in FIG. 3, designating as to which downlink serving cell's A-CSI should be reported, in addition to whether or not A-CSI needs to be reported, by adding one bit to an existing A-CSI trigger field (one bit), is under study.

For example, in FIG. 3, when the value of the two-bit A-CSI trigger field (also referred to as "CSI request field") is "00," this means that "A-CSI is not transmitted." Also, when the A-CSI trigger field value is "01," this means that "A-CSI with respect to a serving cell of a downlink CC corresponding to an uplink CC associated with a UL grant is transmitted." Also, when the A-CSI trigger field value is "10," this means that "A-CSI with respect to at least one serving cell designated as the first set by higher layer signaling is transmitted." Also, when the A-CSI trigger field value is "11," this means that "A-CSI with respect to at least one serving cell designated as a second set by higher layer signaling is transmitted."

In the above-described examples, by reporting at least one downlink serving cell constituting the first set and the second set by higher control signals using higher layer signaling (for example, RRC signaling), two types of reporting patterns are realized when the A-CSI trigger field value is "10" and "11."

For example, assume that, when a user terminal uses two serving cells (cells #0 and #1), cell #0 is reported as the first set and cell #1 is reported as the second set, in advance, by higher layer signaling. In this case, when the A-CSI trigger field value included in the UL grant (format 0/4) is "10," the user terminal reports A-CSI of cell #0 of the first set to the radio base station apparatus. On the other hand, when the A-CSI trigger field value is "11," the user terminal reports A-CSI of cell #1 of the second set.

Figure 4:
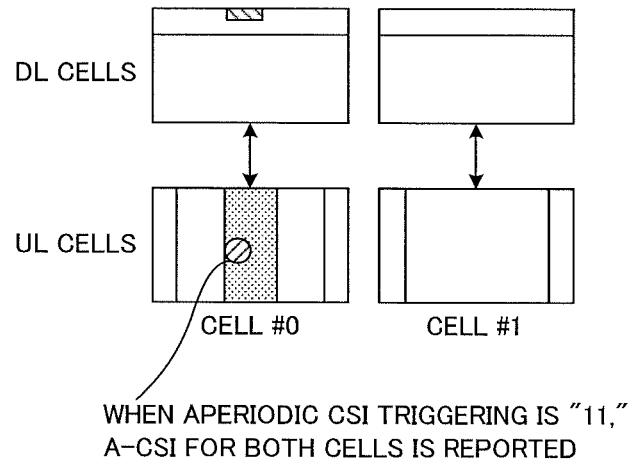
FIG. 4 is a diagram to show an example of an A-CSI reporting method in the LTE-A system.

Also, assume that, when a user terminal uses two serving cells (cell #0 and cell #1), cell #0 is reported as the first set and cell #0 and cell #1 are reported as the second set, in advance, by higher layer signaling. In this case, when the A-CSI trigger field value included in the UL grant (format 0/4) is "10," the user terminal reports A-CSI of cell #0 of the first set, to the radio base station apparatus. On the other hand, when the A-CSI trigger field value is "11," the user terminal reports A-CSI of cell #0 and cell #1 of the second set (see FIG. 4).

Also, assume that, when a user terminal uses five serving cells (cell #0 to cell #4), cell #0 and cell #1 are reported as the first set, and cell #2, cell #3 and cell #4 are reported as the second set, in advance, by higher layer signaling. In this case, when the A-CSI trigger field value included in the UL grant (format 0/4) is "10," the user terminal reports A-CSI of cell #0 and cell #1 of the first set, to the radio base station apparatus. On the other hand, when the A-CSI trigger field value is "11," the user terminal reports A-CSI of cell #2, cell #3 and cell #4 of the first set.

Now, in the LTE system of Rel-11 and later versions, as described above, CoMP techniques to perform coordinated transmission using a plurality of radio base station apparatuses, in order to improve the throughput of cell-edge user terminals, is under study. As CoMP techniques, there are CS (Coordinated Scheduling)/CB (Coordinated Beam-forming)-CoMP, whereby scheduling and beam forming control are performed using CSI in a plurality of radio base station apparatuses, and JP (Joint Processing)-CoMP, whereby the same signal that is transmitted from a plurality of radio base station apparatuses is combined coherently in a user terminal, are under study.

Figure 5:
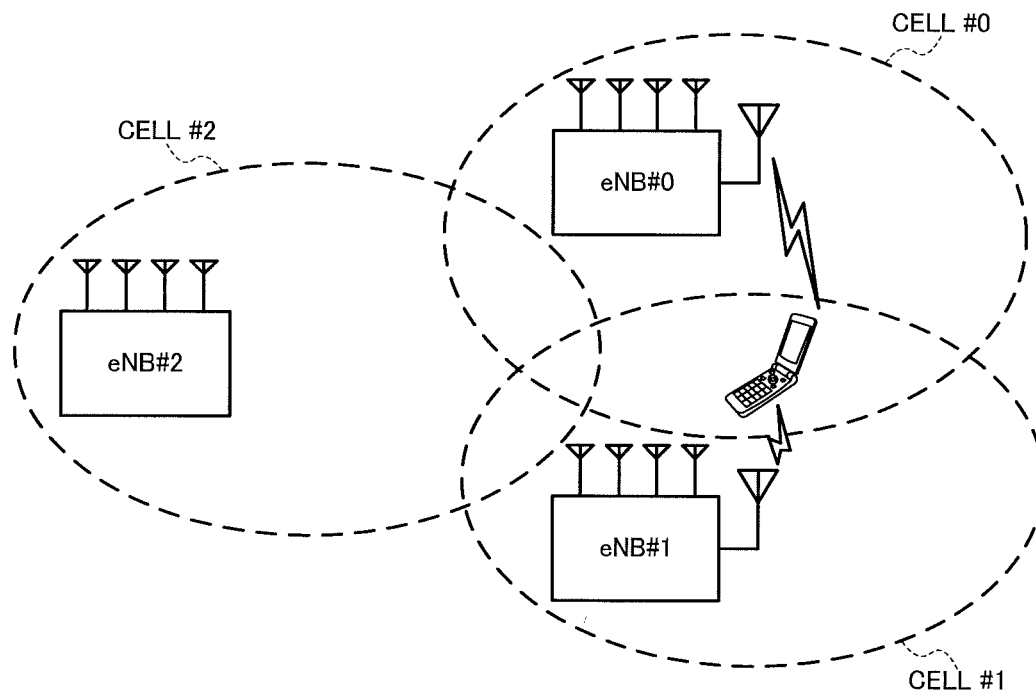
FIG. 5 is a diagram to explain coordinated multiple-point transmission/reception performed in the LTE system.

Now, coordinated multiple-point (CoMP) transmission/reception performed in the LTE system of Rel-11 and later versions will be described. FIG. 5 is a diagram to explain coordinated multiple-point transmission/reception performed in the LTE system of Rel-11 and later versions. Note that FIG. 5 shows a case where three radio base station apparatuses eNBs #0 to #2 coordinate and perform signal processing for transmission and reception with respect to a user terminal UE. Note that, as shown in FIG. 5, the set of radio base station apparatuses eNBs #0 to #2 to perform signal processing for transmission and reception for the user terminal UE is also referred to as "CoMP set."

As shown in FIG. 5, radio base station apparatuses eNBs #0 to #2 are provided in cells #0 to #2, respectively. Here, assume that cell #0 constitutes a serving cell and cells #1 and #2 constitute a coordinated cell. In this way, when CoMP transmission/reception is performed by radio base station apparatuses eNBs #0 to #2 provided in varying cells #0 to #2, the conditions of communication such as the interference level vary per cell (serving cell, coordinated cell and so on). Consequently, when the user terminal UE performs aperiodic channel state information reporting (aperiodic CSI reporting), it is necessary to feedback aperiodic channel state information (A-CSI) to radio base station apparatuses eNBs #0 to #2.

The present inventors have focused on the fact that reporting aperiodic channel state information (A-CSI) adequately to coordinated radio base station apparatuses eNBs #0 to #2 would contribute to improvement of throughput performance of cell-edge user terminals UEs. Then, the present inventors have arrived at the present invention upon finding out that it is possible to flexibly report A-CSI to a plurality of radio base station apparatuses eNBs #0 to #2 to be coordinated, by adding bit information that designates a radio base station apparatus eNB, to which A-CSI should be reported, in a CSI request field of a DCI format, upon CoMP transmission/reception.

That is to say, a gist of the present invention is that, when a plurality of radio base station apparatuses perform coordinated multiple-point transmission/reception, an uplink scheduling grant, which includes a request field that requests reporting of aperiodic channel state information from a user terminal, and an identification field that identifies a radio base station apparatus to which the aperiodic channel state information should be reported, is transmitted to the user terminal, via a downlink control channel, so that it is possible to flexibly report A-CSI to a plurality of radio base station apparatuses to be coordinated.

In the first aspect of the channel state information reporting method according to the present invention, when coordinated multiple-point (CoMP) transmission/reception is performed, bit information to designate a predetermined radio base station apparatus, in addition to an A-CSI trigger, is added in an uplink scheduling grant (hereinafter referred to as "UL grant") (DCI format 0/4). By this means, it is possible to designate a radio base station apparatus, to which A-CSI should be reported, by an UL grant, so that it is possible to adequately feedback the conditions of communication between each radio base station apparatus and a user terminal, such as the interference level, to a targeted radio base station apparatus. By this means, it is possible to effectively perform coordinated multiple-point transmission/reception between a plurality of radio base station apparatuses included in a CoMP set.

For example, the channel state information reporting method according to the present invention designate as to the A-CSI of which radio base station apparatus should be reported, among the radio base station apparatuses to be coordinated, in addition to whether or not A-CSI needs to be reported, by adding one bit to an existing A-CSI trigger field (one bit). Here, one bit to be added to the A-CSI trigger field constitutes the bit information of the identification field, which identifies a radio base station apparatus to which A-CSI should be reported. FIG. 6 provides diagrams to show examples of a CSI request field used in the channel state information reporting method according to the present invention. FIG. 6 shows a CSI request field in the event one bit is added to an existing A-CSI trigger field (one bit). That is to say, the CSI request field is constituted with bit information of two bits. Note that, FIG. 6, as shown in FIG. 5, shows an example of a case where three radio base station apparatuses eNBs #0 to #2 perform coordinated multiple-point transmission/reception for a user terminal UE.

In the example shown in FIG. 6A, when the value of the two-bit CSI request field is "00," this means that "A-CSI is not transmitted." Also, when the CSI request field value is "01," this means that "A-CSI with respect to at least one radio base station apparatus eNB designated as the first set by higher layer signaling is transmitted." Also, when the CSI request field value is "10," this means that "A-CSI with respect to at least one radio base station apparatus eNB designated as a second set by higher layer signaling is transmitted." Also, when the CSI request field value is "11," this means that "A-CSI with respect to at least one radio base station apparatus eNB designated as a third set by higher layer signaling is transmitted."

In the above-described examples, for example, by reporting at least one radio base station apparatus eNB constituting the first to third sets in advance, in advance, by higher control signals using higher layer signaling (for example, RRC signaling), it is possible to realize three reporting patterns when the A-CSI trigger field value is "01," "10" and "11."

For example, assume that, as shown in FIG. 5, when three radio base station apparatuses eNBs #0 to #2 perform coordinated multiple-point transmission, by higher layer signaling, radio base station apparatus eNB #0 is reported as the first set, radio base station apparatus eNB #1 is reported as a second set, and radio base station apparatus eNB #2 is reported as a third set, in advance. In this case, when the value of the A-CSI trigger field included in a UL grant (format 0/4) is "01," the user terminal UE estimates A-CSI with respect to radio base station apparatus eNB #0 of the first set, and reports this A-CSI to radio base station apparatus eNB #0. Also, when the A-CSI trigger field value is "10," the user terminal UE estimates A-CSI with respect to radio base station apparatus eNB #1 of the second set, and reports this A-CSI to radio base station apparatus eNB #1. Furthermore, when the A-CSI trigger field value is "11," the user terminal UE estimates A-CSI with respect to radio base station apparatus eNB #2 of the third set, and reports this A-CSI to radio base station apparatus eNB #2.

Also, when three radio base station apparatuses eNBs #0 to #2 perform coordinated multiple-point transmission, radio base station apparatus eNB #0 is reported as the first set, radio base station apparatuses eNBs #0 to #2 are reported as a second set, and radio base station apparatuses eNBs #0 and #1 are reported as a third set, by higher layer signaling. In this case, when the value of the A-CSI trigger field included in a UL grant (format 0/4) is "01," the user terminal UE estimates A-CSI with respect to radio base station apparatus eNB #0 of the first set, and reports this A-CSI to radio base station apparatus eNB #0. Also, when the A-CSI trigger field value is "10," the user terminal UE estimates A-CSI with respect to radio base station apparatuses eNBs #0 and #1 of the second set, and reports these to radio base station apparatuses eNBs #0 and #1. Furthermore, when the A-CSI trigger field value is "11," the user terminal UE estimates A-CSI with respect to radio base station apparatuses eNBs #0 to #2 of the third set, and reports these to radio base station apparatuses eNBs #0 to #2.

Note that, in this way, when a radio base station apparatus eNB, to which A-CSI should be reported, upon CoMP transmission/reception, is designated by one bit added to the A-CSI trigger field (CoMP mode), it is possible to easily switch to the case where, similarly, a downlink serving cell, to which A-CSI should be reported, upon carrier aggregation (hereinafter referred to as "CA"), is designated by one bit that is added to the A-CSI trigger field (CA mode: see FIG. 3). FIG. 6B is a diagram to show an example of a CSI request field taking into account the switching with the case of designating a downlink serving cell upon CA.

In the example shown in FIG. 6B, when the value of the two-bit CSI request field is "00," this means that "A-CSI is not transmitted." Also, when the CSI request field value is "01," this means that "A-CSI with respect to a serving cell of a downlink CC corresponding to an uplink CC associated with a UL grant is transmitted." The example shown in FIG. 5 shows transmitting A-CSI with respect to radio base station apparatus eNB #0 provided in the serving cell. Also, when the CSI request field value is "10," this means that "A-CSI with respect to at least one radio base station apparatus eNB designated as the first set by higher layer signaling is transmitted."

In the above-described examples, for example, by higher control signals using higher layer signaling (for example, RRC signaling), at least one radio base station apparatus eNB to constitute the first and second sets is reported in advance, so that it is possible to realize two reporting patterns when the A-CSI trigger field value is "10" and "11." Furthermore, when the A-CSI trigger field value is "01," it is not necessary to report the radio base station apparatus eNB to be the target of A-CSI reporting by higher layer signaling. Consequently, even upon switching from the case of designating a downlink serving cell upon carrier aggregation, it is possible to reduce the amount of information to report by higher layer signaling.

Here, the switch between CoMP mode and CA mode may be designated by, for example, higher control signals using higher layer signaling (for example, RRC signaling). For example, when switch from CA mode to CoMP mode is reported by higher layer signaling, the definition of the bit information constituting the CSI request field is replaced by the definition shown in FIG. 3 to FIG. 6. On the other hand, when switch from CoMP mode to CA mode is reported by higher layer signaling, the definition of the bit information constituting the CSI request field is replaced by the definition shown in FIG. 6 to FIG. 3.

In the examples described above, a case has been shown where a radio base station apparatus eNB, to which A-CSI should be reported, is designated by adding one bit to an existing A-CSI trigger field (one bit), However, as for the number of bits to be added to an existing A-CSI trigger field (one bit), it is equally possible to add a data field of two bits or more. In this case, two bits or more bits to be added to the A-CSI trigger field constitute bit information of the identification field which identifies the radio base station apparatus to which A-CSI should be reported. FIG. 7 is a diagram to show an example of a CSI request field used in the channel state information reporting method according to the present invention. In FIG. 7, a CSI request field in the event two bits are added to an existing A-CSI trigger field (one bit) is shown. That is to say, the CSI request field is formed with bit information of three bits.

The example shown in FIG. 7 means that "A-CSI is not transmitted" when the value of the CSI request field of three bits is "000." The example shown in FIG. 7 also means that "A-CSI with respect to at least one radio base station apparatus eNB designated as the first set by higher layer signaling is transmitted" when the CSI request field value is "001." The example shown in FIG. 7 also means that "A-CSI with respect to at least one radio base station apparatus eNB designated as a second set by higher layer signaling is transmitted" when the CSI request field value is "010." The example shown in FIG. 7 also means that "A-CSI with respect to at least one radio base station apparatus eNB designated as a third set by higher layer signaling is transmitted" when the CSI request field value is "011."

Also, the example shown in FIG. 7 means that "A-CSI with respect to at least one radio base station apparatus eNB designated as a fourth set by higher layer signaling is transmitted" when the CSI request field value is "100." The example shown in FIG. 7 also means that "A-CSI with respect to at least one radio base station apparatus eNB designated as a fifth set by higher layer signaling is transmitted" when the CSI request field value is "101." The example shown in FIG. 7 also means that "A-CSI with respect to at least one radio base station apparatus eNB designated as a sixth set by higher layer signaling is transmitted" when the CSI request field value is "110." The example shown in FIG. 7 also means that "A-CSI with respect to at least one radio base station apparatus eNB designated as a seventh set by higher layer signaling is transmitted" when the CSI request field value is "111."

For example, as shown in FIG. 5, assume that, when three radio base station apparatuses eNBs #0 to #2 perform coordinated multiple-point transmission, by higher layer signaling, radio base station apparatus eNB #0 is reported as the first set, radio base station apparatus eNB #1 is reported as a second set, radio base station apparatus eNB #2 is reported as a third set, radio base station apparatuses eNBs #0 and #1 are reported as a fourth set, radio base station apparatuses eNBs #0 and #2 are reported as a fifth set, radio base station apparatuses eNBs #1 and #2 are reported as a sixth set, and radio base station apparatuses eNBs #0 to #2 are reported as a seventh set, in advance.

In this case, when the value of the A-CSI trigger field included in a UL grant (format 0/4) is "001," the user terminal UE estimates A-CSI with respect to radio base station apparatus eNB #0 of the first set, and reports this A-CSI to radio base station apparatus eNB #0. Also, when the A-CSI trigger field value is "010," the user terminal UE estimates A-CSI with respect to radio base station apparatus eNB #1 of the second set, and reports this A-CSI to radio base station apparatus eNB #1. Furthermore, when the A-CSI trigger field value is "011," the user terminal UE estimates A-CSI with respect to radio base station apparatus eNB #2 of the third set, and reports this A-CSI to radio base station apparatus eNB #2.

Also, when the A-CSI trigger field value is "100," the user terminal UE estimates A-CSI with respect to radio base station apparatuses eNBs #0 and #1 of the fourth set, and reports these to radio base station apparatuses eNBs #0 and #1. Furthermore, when the A-CSI trigger field value is "101," the user terminal UE estimates A-CSI with respect to radio base station apparatuses eNBs #0 and #2 of the fifth set, and reports these to radio base station apparatuses eNBs #0 and #2. Also, when the A-CSI trigger field value is "110," the user terminal UE estimates A-CSI with respect to radio base station apparatuses eNBs #1 and #2 of the sixth set, and reports these to radio base station apparatuses eNBs #1 and #2. Furthermore, when the A-CSI trigger field value is "111," the user terminal UE estimates A-CSI with respect to radio base station apparatuses eNBs #0 to #2 of the seventh set, and reports these to radio base station apparatuses eNBs #0 to #2.

In the above-described examples, for example, by reporting at least one radio base station apparatus eNB constituting the first to seventh sets, in advance, by higher control signals by higher layer signaling (for example, RRC signaling), it is possible to realize seven reporting patterns when the A-CSI trigger field value is "001," "010," "011," "100," "101," "010" and "111."

In the above description, a case has been described where two bits are newly added, in an existing A-CSI trigger field (one bit), as bit information to designate a radio base station apparatus eNB to which A-CSI should be reported. Here, considering the signaling overhead, it is preferable to make the number of bits to include in a UL grant small. To meet such demand, it may be possible to utilize bit information that is available for use, among bit information that is included in the UL grant. For example, it may be possible to utilize two bits for requesting (triggering) reporting of aperiodic SRS (hereinafter referred to as "A-SRS").

In the LTE system (LTE-A system) of Rel-10 and later versions supporting uplink multi-antenna transmission, the frequency and necessity of the reference signal (SRS: Sounding Reference Signal) for uplink channel quality measurement is expected to increase. Consequently, in addition to the periodic SRS employed in the LTE (Rel-8) system, employing the A-SRS to provide transmission opportunities (triggers) at arbitrary timing is under study.

The A-SRS is an SRS which the user terminal UE transmits aperiodically, by triggering by lower layer signaling (PDCCH DCI format 4). In the LTE-A system, the A-SRS is used from the perspective of transmitting the SRS efficiently, given that the uplink channel states for a plurality of antennas of a user terminal UE are estimated in a plurality of radio base station apparatuses eNBs. Whether or not to transmit the A-SRS can be selected on the network side, on a per user terminal UE basis, so that there is an agreement to use a UL grant (PDCCH DCI format 0/4) as an A-SRS trigger.

When the A-SRS is triggered via DCI format 0, an additional one-bit field is added to DCI format 0, and bit data to represent the content of SRS transmission is arranged in the additional one-bit field. On the other hand, when the SRS (A-SRS) is triggered via DCI format 4, normally, an additional two-bit field (hereinafter referred to as "A-SRSF") for SRS triggering is added to DCI format 4. When the A-SRS is triggered, the A-SRSF is added to DCI format 4, and bit data to represent the content of SRS transmission is arranged in this A-SRSF. Consequently, when the SRS is triggered aperiodically via DCI format 4, the A-SRSF is added to DCI format 4, even in the period where the A-SRS is not applied.

By utilizing such two bits for triggering the A-SRS as a bit field for triggering A-CSI, it is possible to effectively utilize SRS resources in CoMP transmission/reception. Here, the two bits for triggering the A-SRS are a bit field to be used only when the A-SRS is set by higher control signals using higher layer signaling. Consequently, when the SRS is not set by higher layer signaling, the two bits for triggering the A-SRS become a bit field that is not used. Consequently, when the SRS is not set by higher layer signaling, it is possible to use the two bits for triggering the A-SRS as an A-CSI triggering bit field. FIG. 8 shows examples of a CSI request field in the event effective use of an A-SRS triggering bit field (also referred to as "SRS request field") is taken into account.

In the example shown in FIG. 8, when the value of the one-bit CSI request field is "0" and the value of the two-bit SRS request field is "00," this means that "A-CSI is not transmitted." Also, when the value of the CSI request field is "0" and the value of the SRS request field is "01," this means that "A-CSI with respect to at least one radio base station apparatus eNB designated as the first set by higher layer signaling is transmitted." Also, when the value of the CSI request field is "0" and the value of the SRS request field is "10," this means that "A-CSI with respect to at least one radio base station apparatus eNB designated as a second set by higher layer signaling is transmitted." When the value of the CSI request field is "0" and the value of the SRS request field is "11," this means that "A-CSI with respect to at least one radio base station apparatus eNB designated as a third set by higher layer signaling is transmitted."

When the value of the CSI request field is "1" and the value of the SRS request field is "00," this means that "A-CSI with respect to at least one radio base station apparatus eNB designated as a fourth set by higher layer signaling is transmitted." Also, when the value of the CSI request field is "1" and the value of the SRS request field is "01," this means that "A-CSI with respect to at least one radio base station apparatus eNB designated as a fifth set by higher layer signaling is transmitted." Also, when the value of the CSI request field is "1" and the value of the SRS request field is "10," this means that "A-CSI with respect to at least one radio base station apparatus eNB designated as a sixth set by higher layer signaling is transmitted." Also, when the value of the CSI request field is "1" and the value of the SRS request field is "11," this means that "A-CSI with respect to at least one radio base station apparatus eNB designated as a seventh set by higher layer signaling is transmitted."

For example, assume that, as shown in FIG. 5, when three radio base station apparatuses eNBs #0 to #2 perform coordinated multiple-point transmission, by higher layer signaling, radio base station apparatus eNB #0 is reported as the first set, radio base station apparatus eNB #1 is reported as a second set, radio base station apparatus eNB #2 is reported as a third set, radio base station apparatuses eNBs #0 and #1 are reported as a fourth set, radio base station apparatuses eNBs #0 and #2 are reported as a fifth set, radio base station apparatuses eNBs #1 and #2 are reported as a sixth set, and radio base station apparatuses eNBs #0 to #2 are reported as a seventh set, in advance.

In this case, when the value of the A-CSI trigger field included in a UL grant (format 0/4) is "0" and the A-SRS trigger field value is "01," the user terminal UE estimates A-CSI with respect to radio base station apparatus eNB #0 of the first set, and reports this A-CSI to radio base station apparatus eNB #0. Also, when the A-CSI trigger field value is "0" and the A-SRS trigger field value is "10," the user terminal UE estimates A-CSI with respect to radio base station apparatus eNB #1 of the second set, and reports this A-CSI to radio base station apparatus eNB #1. Furthermore, when the A-CSI trigger field value is "0" and the A-SRS trigger field value is "11," the user terminal UE estimates A-CSI with respect to radio base station apparatus eNB #2 of the third set, and reports this A-CSI to radio base station apparatus eNB #2.

Also, when the A-CSI trigger field value is "1" and the A-SRS trigger field value is "00," the user terminal UE estimates A-CSI with respect to radio base station apparatuses eNBs #0 and #1 of the fourth set, and reports these to radio base station apparatuses eNBs #0 and #1. Furthermore, when the A-CSI trigger field value is "1" and the A-SRS trigger field value is "01," the user terminal UE estimates A-CSI with respect to radio base station apparatuses eNBs #0 and #2 of the fifth set, and reports these to radio base station apparatuses eNBs #0 and #2. Also, when the A-CSI trigger field value is "1" and the A-SRS trigger field value is "01," the user terminal UE estimates A-CSI with respect to radio base station apparatuses eNBs #1 and #2 of the sixth set, and reports these to radio base station apparatuses eNBs #1 and #2. Furthermore, when the A-CSI trigger field value is "1" and the A-SRS trigger field value is "10," the user terminal UE estimates A-CSI with respect to radio base station apparatuses eNBs #0 to #2 of the seventh set, and reports these to radio base station apparatuses eNBs #0 to #2.

In the above-described examples, for example, by reporting at least one radio base station apparatus eNB constituting the first to seventh sets, in advance, by higher control signals by higher layer signaling (for example, RRC signaling), it is possible to realize seven reporting patterns when the A-CSI trigger field value is "0" and "1" and the A-SRS trigger field is "00," "01," "10," and "11." Furthermore, when the SRS (A-SRS) is triggered aperiodically via DCI format 4, an A-SRSF, which is an additional two-bit field for SRS triggering added to DCI format 4 is always used even in the period where the A-SRS is not applied, so that it is possible to effectively utilize radio resources that are secured for the A-SRSF on a fixed basis.

Note that, in the above description, a case has been described where three radio base station apparatuses eNBs #0 to #2 perform coordinated multiple-point transmission, as applicable targets, when three bits, including one bit of a CSI request field and two bits of an A-SRS request field are used as a bit field for triggering A-CSI. However, when three bits are used as a bit field for triggering A-CSI, it is possible to flexibly report A-CSI to four or more radio base station apparatuses eNBs as well.

Here, as shown in FIG. 6 or FIG. 7, the timing to add one bit or two bits to an existing A-CSI trigger field (one bit) will be described. Generally, prior to transition of CoMP mode, a radio base station apparatus eNB performs communication control with a user terminal UE according to the specifications of the Rel-8 LTE system. Then, for example, when transition to CoMP mode is commanded from a higher station apparatus, communication control is performed by switching from Rel-8 to the Rel-11 LTE system specifications. When one bit or two bits are added to the A-CSI trigger field (one bit), it is possible to add in accordance with such command of transition to CoMP mode.

Also, as for the timing to add one bit or two bits to an existing A-CSI trigger field (one bit), it is possible to add on the network side, in accordance with capability information that is transmitted from the user terminal UE when communication is started. For example, when a user terminal UE to support the Rel-11 LTE system is identified by capability information from the user terminal UE, it is possible to add one bit or two bits to the existing A-CSI trigger field (one bit).

According to the first aspect, given that, when coordinated multiple-point (CoMP) transmission/reception is performed, the conditions of communication such as the interference level vary per cell (serving cell, coordinated cell and so on), a case has been described where aperiodic channel state information (A-CSI) is adequately feedback to coordinated radio base station apparatuses eNBs. However, when coordinated multiple-point (CoMP) transmission/reception is performed, it is necessary to adequately send feedback to coordinated radio base station apparatuses eNBs, with respect to periodic channel state information as well, in addition to aperiodic channel state information.

The channel state information reporting method according to the present invention makes applied use of the feedback method that is used when carrier aggregation is performed, when aperiodic channel state information reporting (aperiodic CSI reporting) is executed during coordinated multiple-point (CoMP) transmission/reception. On the other hand, even when periodic channel state information reporting (periodic CSI reporting) is performed during execution of coordinated multiple-point (CoMP) transmission/reception, it is possible to make applied use of the feedback method that is used when carrier aggregation is performed.

According to the second aspect, the channel state information reporting method according to the present invention transmits parameters for designating subframes and radio resources for allocating periodic channel state information with respect to a specific radio base station apparatus among a plurality of radio base station apparatuses to perform coordinated multiple-point (CoMP) transmission/reception, are transmitted by higher layer signaling. By this means, it is possible to adequately estimate and feedback the conditions of communication between each radio base station apparatus and a user terminal, such as the interference level, to a targeted radio base station apparatus, so that it is possible to effectively execute coordinated multiple-point transmission/reception between a plurality of radio base station apparatuses included in a CoMP set.

In the Rel-10 LTE system, when radio communication is performed using carrier aggregation, parameters that are defined separately per cell are reported to a user terminal UE, by higher control signals using higher layer signaling (for example, RRC signaling), so that periodic channel state information reporting (periodic CSI reporting) from the user terminal UE is performed.

Figure 9:
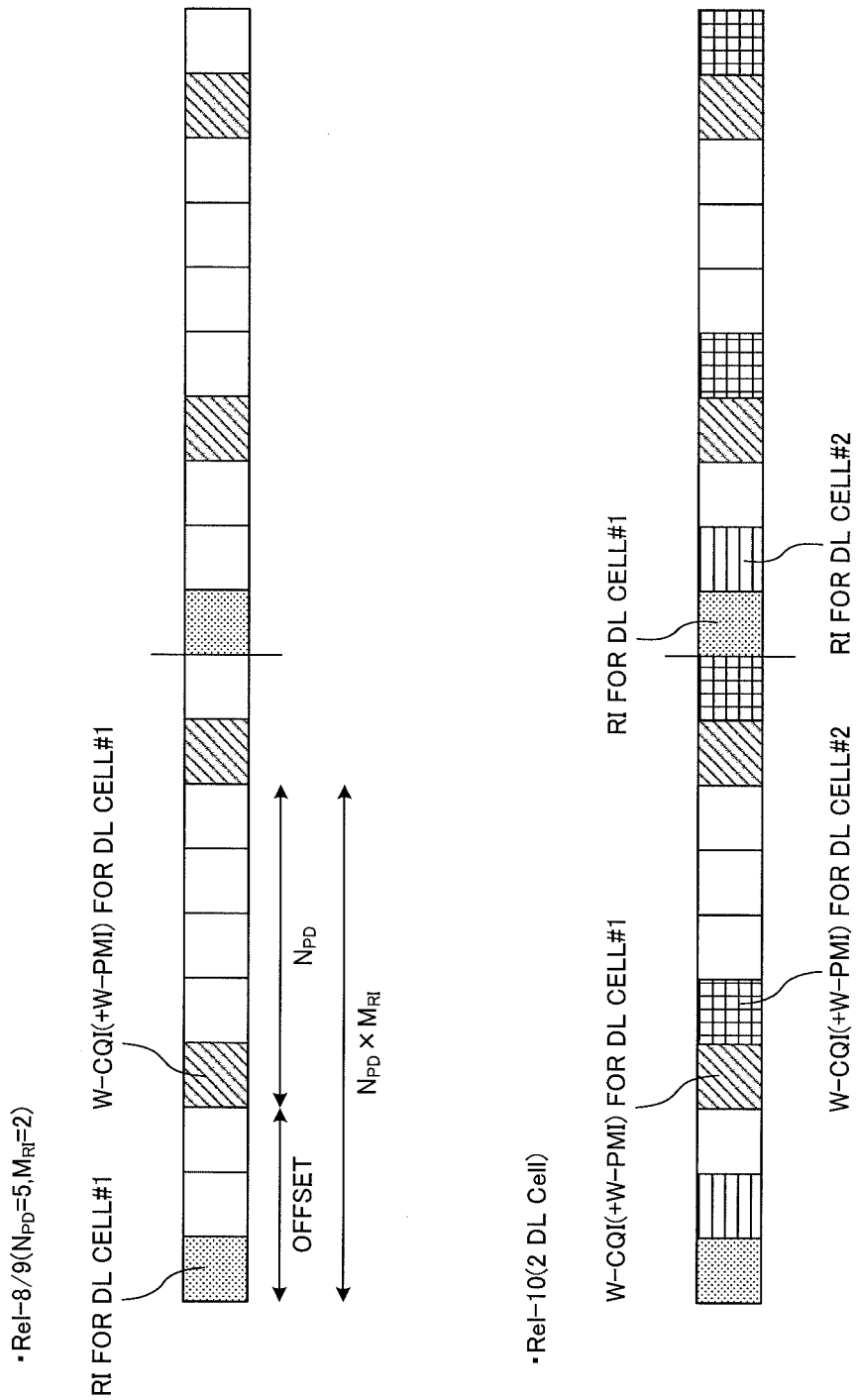
FIG. 9 is a schematic diagram to show transmission timing of downlink periodic channel state information according to the present embodiment.

FIG. 9 is a schematic diagram showing transmission timing of downlink periodic channel state information in the LTE system of Rel-8/9 and Rel-10 (2 DL cells). The periodic channel state information (PMI/CQI, RI) is fed back to a radio base station apparatus using the PUCCH. Note that FIG. 9 schematically shows the PUCCH where the time axis is assigned in the horizontal direction.

As shown in FIG. 9, in the periodic channel state information reporting (periodic CSI reporting) in the Rel-8/9 LTE systems, wideband CQI (WB-CQI) and wideband PMI (WB-PMI), and the RI are fed back to a radio base station apparatus, in separate subframes (TTIs: Transmission Time Intervals).

In Rel-8/9 ($N_{pd}$=5 and $M_{RI}$=2) shown in FIG. 9, a case is shown where a user terminal UE performs periodic channel state information reporting (periodic CSI reporting) for DL cell #1. Also, a case is shown where the cycle of WB-PMI/WB-CQI is five subframes ($N_{pd}$=5), the cycle of the RI is twice the cycle of WB-PMI/WB-CQI ($M_{RI}$=2), and a subframe to feed back the RI is two subframes off-set from a subframe to feedback WB-PMI/WB-CQI.

On the other hand, in the Rel-10 (2 DL cell) shown in FIG. 9, the user terminal UE performs periodic channel state information reporting (periodic CSI reporting) to DL cell #1 and DL cell #2. The PMI and WB-CQI and the RI for DL cell #1 and for DL cell #2 are feedback in different subframes. Also, a case is shown where the cycle of WB-PMI/WB-CQI for DL cell #1 is five subframes, the cycle of the RI is twice the cycle of WB-PMI/WB-CQI (ten subframes), and a subframe to feed back the RI is two subframes off-set from a subframe to feedback WB-PMI/WB-CQI. Also, the PMI and WB-CQI and the RI for DL cell #2 are transmitted in a cycle that is one subframe different from the PMI and WB-CQI and the RI for DL cell #1.

With the channel state information reporting method according to the present invention, periodic channel state information reporting is performed by replacing cells in Rel-10 (2 DL cells) shown in FIG. 9 by radio base station apparatuses eNBs to perform CoMP transmission/reception. Here, assume that the radio base station apparatuses eNBs to perform CoMP transmission/reception are two radio base station apparatuses eNBs #1 and #2, and are reported by higher layer signaling by the above-described parameters ($N_{pd}$=5 and $M_{RI}$=2). In this case, the PMI and WB-CQI and the RI for radio base station apparatuses eNBs #1 and #2 are feedback in different subframes. Also, a case is shown where the cycle of WB-PMI/WB-CQI for radio base station apparatus eNB #1 is five subframes ($N_{pd}$=5), the cycle of the RI is twice the cycle of WB-PMI/WB-CQI ($M_{RI}$=2), and a subframe to feedback the RI is two subframes off-set from a subframe to feedback WB-PMI/WB-CQI. Also, the PMI and WB-CQI and the RI for radio base station apparatus eNB #2 are transmitted in a cycle that is one subframe different from the PMI and WB-CQI and the RI for radio base station apparatus eNB #1.

In this way, with the channel state information reporting method according to the present invention, parameters for designating subframes and radio resources to allocate periodic channel state information with respect to a specific radio base station apparatus eNB, among a plurality of radio base station apparatuses eNBs that perform coordinated multiple-point transmission/reception, are transmitted by higher layer signaling. Then, periodic channel state information with respect to the specific radio base station apparatus eNB is transmitted by subframes designated by the parameters from the user terminal UE, to that radio base station apparatus eNB, via an uplink control channel (PUCCH). By this means, it is possible to adequately feedback the conditions of communication between each radio base station apparatus eNB and a user terminal UE, such as the interference level, to a targeted radio base station apparatus eNB, so that it is possible to effectively execute coordinated multiple-point transmission/reception between a plurality of radio base station apparatuses eNBs included in a CoMP set.

Now, a radio communication system according to an embodiment of the present invention will be described in detail. Note that the radio communication system is a system to accommodate, for example, the LTE system or SUPER 3G. This radio communication system is applied carrier aggregation, which makes a plurality of fundamental frequency blocks, in which the system band of the LTE system is one unit, as one. Also, this radio communication system may be referred to as IMT-Advanced or may be referred to as 4G.

The radio communication system according to the present embodiment is formed with a radio base station apparatus and a plurality of mobile terminal apparatuses that communicate with this radio base station apparatus. The radio base station apparatus is connected with a higher station apparatus, and this higher station apparatus is connected with a core network. Also, radio base station apparatuses are connected with each other by wire connection or by wireless connection. A mobile terminal apparatus is able to communicate with a radio base station apparatus in a cell. Note that the higher station apparatus includes, for example, an access gateway apparatus, a radio network controller (RNC), a mobility management entity (MME) and so on, but is by no means limited to these.

Although a mobile terminal apparatus may be either an LTE terminal or an LTE-A terminal, simply a mobile terminal apparatus will be described, unless specified otherwise. Also, although mobile terminal apparatuses perform radio communication with radio base station apparatuses for ease of explanation, more generally, user apparatuses (UEs) including mobile terminal apparatuses and fixed terminal apparatuses may be used as well.

In the radio communication system, for radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

The downlink communication channels include the PDSCH (Physical Downlink Shared Channel) as a downlink data channel that is shared by mobile terminal apparatuses, and downlink L1/L2 control channels (PDCCH, PCFICH, PHICH). Transmission data and higher control information are transmitted by the PDSCH. Scheduling information for the PDSCH and the PUSCH is transmitted by the PDCCH (Physical Downlink Control Channel). The number of OFDM symbols to be used for the PDCCH is transmitted by the PCFICH (Physical Control Format Indicator Channel). HARQ ACK/NACK in response to the PUSCH are transmitted by the PHICH (Physical Hybrid-ARQ Indicator Channel).

The uplink communication channels include the PUSCH (Physical Uplink Shared Channel), which is used by each mobile terminal apparatus on a shared basis as an uplink data channel, and the PUCCH (Physical Uplink Control Channel), which is an uplink control channel. By means of this PUSCH, transmission data and higher control information are transmitted. Also, downlink channel quality information (CQI), ACK/NACK and so on are transmitted by the PUCCH.

Figure 10:
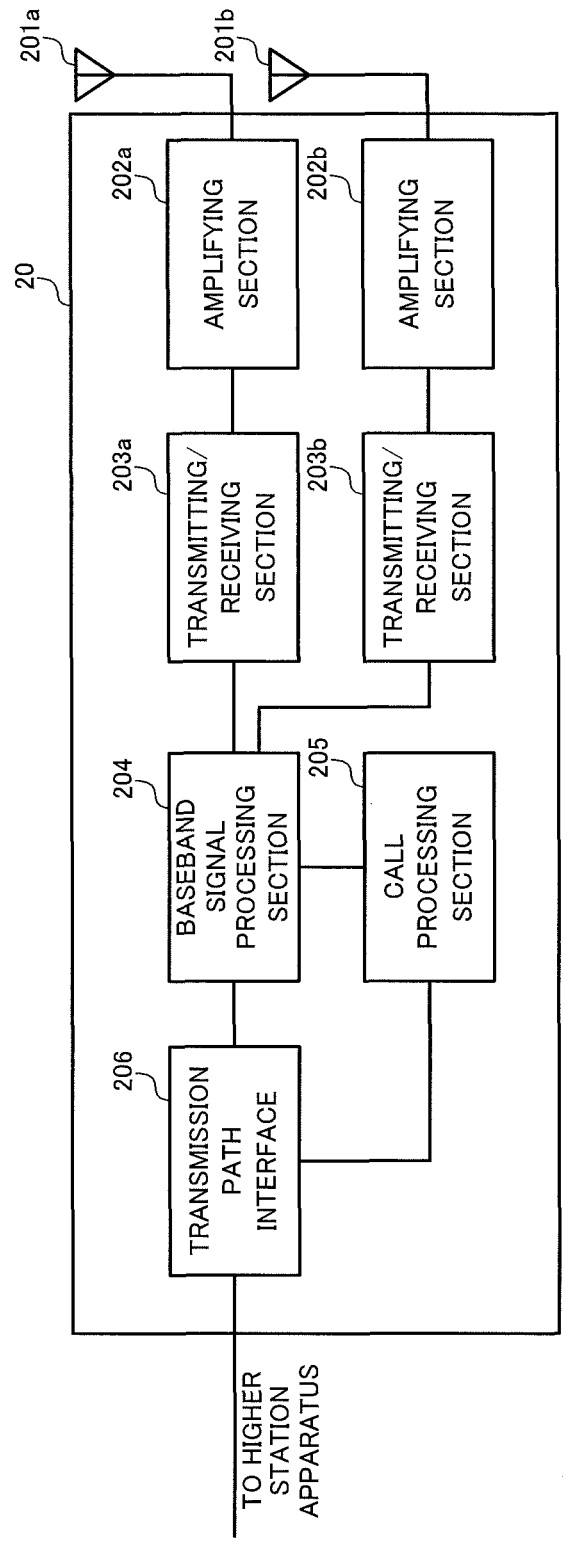
FIG. 10 is a functional block diagram to show an overall configuration of a radio base station apparatus according to an embodiment of the present invention.

Referring to FIG. 10, an overall configuration of the radio base station apparatus 20 according to the present embodiment will be described. The radio base station apparatus 20 has transmitting/receiving antennas 201a and 201b, amplifying sections 202a and 202b, transmitting/receiving sections 203a and 203b, a baseband signal processing section 204, a call processing section 205, and a transmission path interface 206.

User data that is transmitted from the radio base station apparatus 20 to the user terminal 10 is input from a higher station apparatus of the radio base station apparatus 20 to the baseband signal processing section 204 via the transmission path interface 206.

The baseband signal processing section 204 performs, for example, PDCP layer processes such as assigning sequence numbers, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process.

The baseband signal processing section 204 furthermore reports control information for radio communication in the cell to the user terminal 10 by a broadcast channel. Broadcast information for communication in the cell includes, for example, the uplink or downlink system bandwidth, identification information of a root sequence (root sequence index) for generating random access preamble signals in the PRACH, and so on.

In the transmitting/receiving sections 203a and 203b, the baseband signal output from the baseband signal processing section 204 is subjected to frequency conversion into a radio frequency band. The RF signal is amplified in the amplifying sections 202a and 202b and output to the transmitting/receiving antennas 201a and 201b.

The radio base station apparatus 20 receives transmission waves transmitted from the user terminal 10 by the transmitting/receiving antennas 201a and 201b. The radio frequency signals received in the transmitting/receiving antennas 201a and 201b are amplified in the amplifying sections 202a and 202b, subjected to frequency conversion in the transmitting/receiving sections 203a and 203b and converted into baseband signals, and are input in the baseband signal processing section 204.

The baseband signal processing section 204 performs an FFT process, an IDFT process, error correction decoding, a MAC retransmission control receiving process, and RLC layer and PDCP layer receiving processes, of the user data that is included in the baseband signals received in uplink transmission. The decoded signal is transferred to the higher station apparatus through the transmission path interface 206.

The call processing section 205 performs call processing such as setting up and releasing a communication channel, manages the state of the radio base station apparatus 20 and manages the radio resources.

Figure 11:
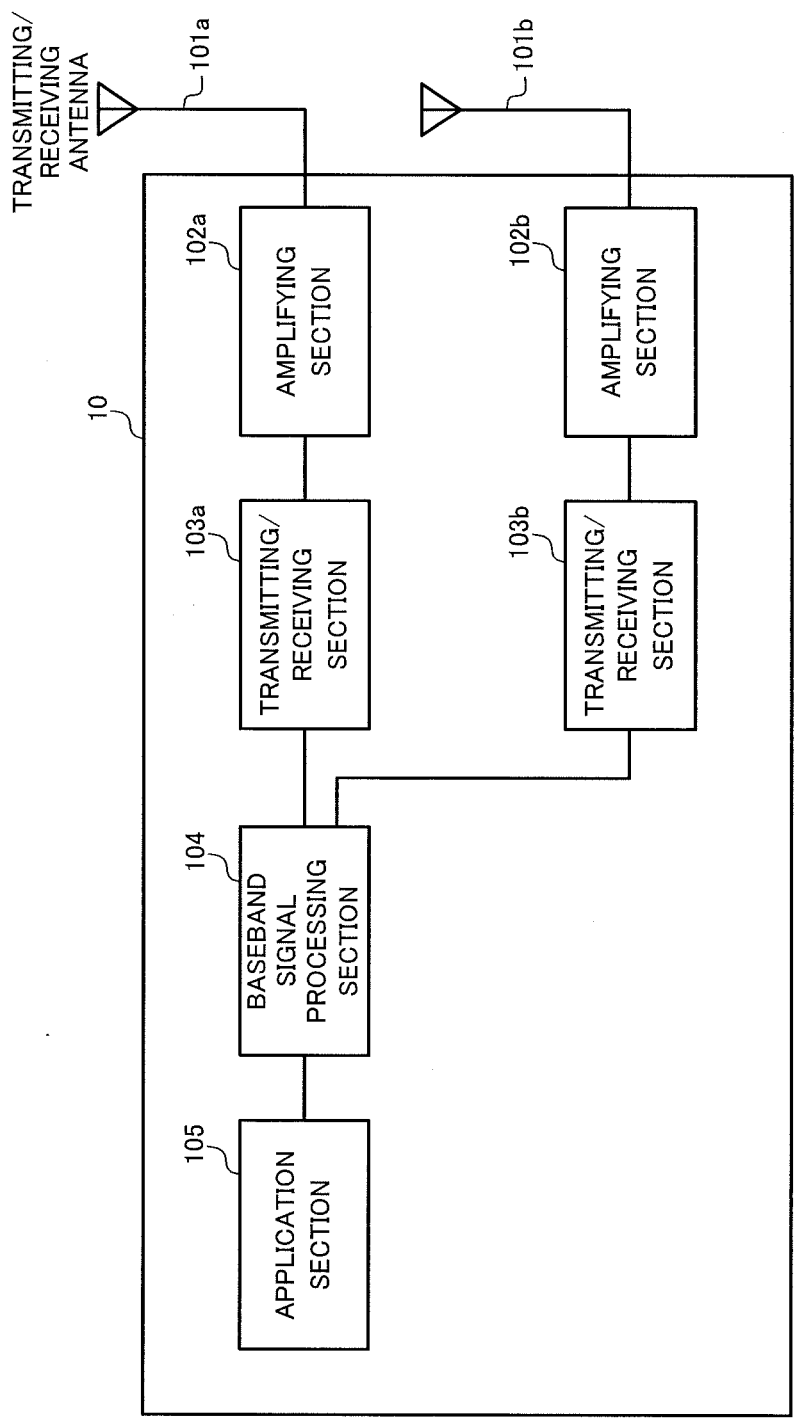
FIG. 11 is a functional block diagram to show an overall configuration of a user terminal according to an embodiment of the present invention.

Next, referring to FIG. 11, an overall configuration of a user terminal 10 according to the present embodiment will be described. The user terminal 10 has a plurality of transmitting/receiving antennas 101a and 101b, amplifying sections 102a and 102b, transmitting/receiving sections 103a and 103b, a baseband signal processing section 104 and an application section 105.

The radio frequency signals received in the transmitting/receiving antennas 101a and 101b are amplified in the amplifying sections 102a and 102b, subjected to frequency conversion in the transmitting/receiving sections 103a and 103b, and converted into baseband signals. This baseband signal is subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 to the baseband signal processing section 104. The baseband signal processing section 104 performs a retransmission control (HARQ) transmission process, channel coding, a DFT process, and an IFFT process. The baseband signal output from the baseband signal processing section 104 is converted into a radio frequency band in the transmitting/receiving section 103, and, after that, amplified in the amplifying sections 102a and 102b and transmitted from the transmitting/receiving antennas 101a and 101b.

Figure 12:
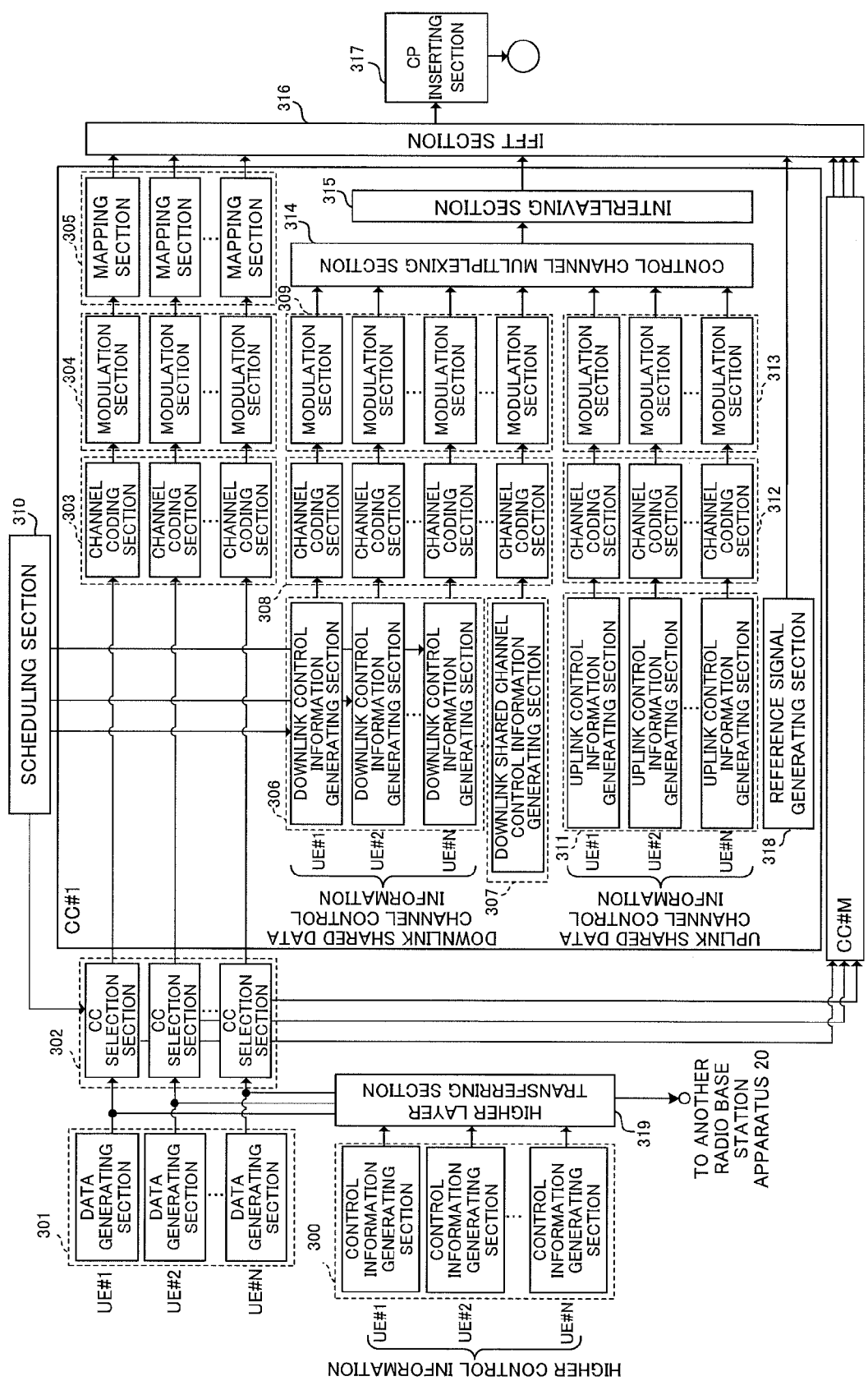
FIG. 12 is a functional block diagram of a baseband processing section provided in a radio base station apparatus according to an embodiment of the present invention, and part of higher layers.

FIG. 12 is a functional block diagram of a baseband signal processing section 204 provided in the radio base station apparatus 20 according to the present embodiment and part of the higher layers, and the baseband signal processing section 204 primarily illustrates the function blocks of a transmission processing section. FIG. 12 shows an example of a base station configuration which can support the number of component carriers M (CC #1 to CC #M). Transmission data for the user terminal 10 under the radio base station apparatus 20 is transferred from the higher station apparatus to the radio base station apparatus 20.

The control information generating sections 300 generate higher control signal to be transmitted and received by higher layer signaling (for example, RRC signaling), and output the generated higher control signal to the higher layer transferring section 319. The higher control signal include information about at least one radio base station apparatus 20, to which the user terminal 10 should report aperiodic or periodic channel state information, in the CoMP set constituted by a plurality of radio base station apparatuses 20. Also, the higher control signal may include a command to request addition/removal of component carriers CC as well. Also, the higher control signal may be generated on a per user basis as well.

For example, when three radio base station apparatuses 20 #0 to #2 perform CoMP transmission/reception using a CSI request field in which one bit is added to an existing A-CSI trigger field (one bit), higher control signal designate the combinations of radio base station apparatuses 20 #0 to #2 to constitute the first to third sets, as shown in FIG. 6A. In this case, higher control signal designate radio base station apparatus 20 #0 as the first set, radio base station apparatus 20 #1 as a second set, and a radio base station apparatus 20 #2 as a third set.

Also, higher control signal may include reporting for switching between the case (CoMP mode) of designating a radio base station apparatus 20 to which A-CSI should be reported upon CoMP transmission/reception by one bit that is added to the A-CSI trigger field, and the case (CA mode) of designating a downlink serving cell to which A-CSI should be reported upon CA, by one bit that is added to the A-CSI trigger field. When switch from CA mode to CoMP mode is reported to each radio base station apparatus 20 #0 to #2 by higher layer signaling, the definition of the bit information constituting the CSI request field is replaced by the definition shown in FIG. 3 to FIG. 6. Also, when switch from CoMP mode to CA mode is reported by higher layer signaling, the definition of the bit information constituting the CSI request field is replaced by the definition shown in FIG. 6 to FIG. 3.

Furthermore, when three radio base station apparatuses 20 #0 to #2 perform CoMP transmission/reception using a CSI request field in which two bits are added to an existing A-CSI trigger field (one bit), higher control signal designate the combinations of radio base station apparatuses 20 #0 to #2 to constitute the first to seventh sets, as shown in FIG. 7. In this case, higher control signal designate radio base station apparatus 20 #0 as the first set, radio base station apparatus 20 #1 as a second set, radio base station apparatus 20 #2 as a third set, radio base station apparatuses 20 #0 and #1 as a fourth set, radio base station apparatuses 20 #0 and #2 as a fifth set, radio base station apparatuses 20 #1 and #2 as a sixth set, and radio base station apparatuses 20 #0 to #2 as a seventh set. Note that, as for the two-bit data field to add to the existing A-CSI trigger field, it is equally possible to use an A-SRSF when the SRS is not set by higher layer signaling, as shown in FIG. 8.

Also, the higher layer signaling may include parameters (for example, ($N_{pd}$=5 and $M_{RI}$=2)) to designate subframes to allocate periodic channel state information, with respect to a specific radio base station apparatus 20 among a plurality of radio base station apparatuses 20 that perform CoMP transmission/reception. In this way, by including parameters to designate subframes to allocate periodic channel state information with respect to a specific radio base station apparatus 20 in higher layer signaling, it is possible to report periodic channel state information to a plurality of radio base station apparatuses 20 to be coordinated, in the user terminal 10.

The higher layer transferring section 319 transfers the higher control signal output from control information generating section 300 to a plurality of radio base station apparatuses 20 constituting the CoMP set. By transferring higher control signal to a plurality of radio base station apparatuses 20 constituting the CoMP set, information that is required for CoMP transmission/reception (for example, information about the type of CoMP transmission/reception, synchronization information, and so on) is shared between these radio base station apparatuses 20. Note that the information about the type of CoMP transmission/reception refers to information that represents whether CoMP transmission/reception to execute is CS/CB-CoMP or JP (Joint Processing)-CoMP.

The data generating sections 301 output transmission data transferred from the higher station apparatus as user data, on a per user basis.

The component carrier selection sections 302 select component carriers to be allocated to radio communication with the user terminals 10, on a per user basis. As described above, an increase/decrease of component carriers is reported from the radio base station apparatus 20 to the user terminal 10 by RRC signaling, and a message of completion of application is received from the user terminal 10 in the component carrier selection sections 302. As this application complete message is received, allocation (addition/removal) of component carriers to that user is fixed, and this fixed component carrier allocation is set in the component carrier selection sections 302 as component carrier allocation information. In accordance with the component carrier allocation information that is set in the component carrier selection sections 302 on a per user basis, higher control signal and transmission data are allocated to the channel coding sections 303 of the applicable component carriers.

The scheduling section 310 controls allocation of component carriers to the user terminals 10 under control, according to overall communication quality of the system band. The scheduling section 310 determines addition/removal of component carriers to allocate to communication with the user terminals 10. A result determined in relationship to addition/removal of component carriers is reported to the control information generating sections 300. Also, for each user terminal, a primary component carrier (PCC) is determined from the component carriers that are selected. The PCC may be switched dynamically or may be switched semi-statically.

Also, the scheduling section 310 controls resource allocation in each component carrier. The scheduling section 310 performs scheduling separately between LTE terminal users and LTE-A terminal users. The scheduling section 310 receives as input transmission data and retransmission commands from the higher station apparatus, and also receives as input the channel estimation values and resource block CQIs from a receiving section having measured uplink received signals.

Also, the scheduling section 310 schedules downlink allocation information, uplink allocation information and uplink/downlink shared channel signals, with reference to the retransmission commands, channel estimation values and CQIs that are received as input from the higher station apparatus 30. A propagation path in mobile communication varies differently per frequency, due to frequency selective fading. So, upon user data transmission, resource blocks of good communication quality are allocated to the user terminals 10 on a per subframe basis (which is referred to as "adaptive frequency scheduling"). In adaptive frequency scheduling, a user terminal 10 of good propagation path quality is selected and allocated to each resource block. Consequently, the scheduling section 310 allocates resource blocks, with which improvement of throughput is anticipated, using the CQI of each resource block, fed back from each user terminal 10.

Also, the scheduling section 310 controls the number of CCE aggregations depending on the conditions of the propagation paths with the user terminals 10. The number of CCE aggregations is increased with respect to cell edge users. Also, the MCS (coding rate and modulation scheme) that fulfills a predetermined block error rate with the allocated resource blocks is determined. Parameters that satisfy the MCS (coding rate and modulation scheme) determined by the scheduling section 310 are set in channel coding sections 303, 308 and 312, and modulation sections 304, 309 and 313.

The baseband signal processing section 204 has channel coding sections 303, modulation sections 304 and mapping sections 305 to support the maximum number of users to multiplex, N, in one component carrier. The channel coding sections 303 perform channel coding of the shared data channel (PDSCH), formed with user data (including part of higher control signal) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has generating sections (downlink control information generating sections 306 and uplink control information generating sections 311) that generate control information using a predetermined DCI format from a plurality of DCI formats. The plurality of DCI formats include a DCI format having a UL grant as its content (for example, DCI format 0/4), and a DCI format having a DL grant as its content (for example, DCI format 1A and so on).

The downlink control information generating sections 306 generate downlink shared data channel control information for controlling the PDSCH using a DCI format having a DL grant as its content (for example, DCI format 1A and so on). The downlink shared data channel control information is generated per user terminal 10.

The uplink control information generating sections 311 constitutes a generating section to generate an uplink scheduling grant, which includes a request field that requests reporting of channel state information from a user terminal, and an identification field that identifies a radio base station apparatus to which the channel state information should be reported, among a plurality of radio base station apparatuses that perform coordinated multiple-point transmission/reception. The uplink control information generating section 311 generates uplink shared data channel control information for controlling the PUSCH using DCI format (for example, DCI format 0/4) having a UL grant as its content. The uplink shared data channel control information is generated per user terminal 10.

The uplink shared data channel control information includes, for example, a UL grant, which has a value of a CSI request field combining one bit as an A-CSI triggering request field and additional one bit or two bits as an identification field that identifies a specific radio base station apparatus 20 among a plurality of radio base station apparatuses 20, shown in FIG. 6 and FIG. 8. For example, when the CSI request field is two bits, when reporting of A-CSI from the user terminal 10 is not requested, "00" is set in the CSI request field, and when reporting of A-CSI from the user terminal 10 is requested, "01," "10" or "11" is set depending on the combination of radio base station apparatuses 10 to which A-CSI should be reported from the user terminal 10 (see FIG. 6). On the other hand, when the CSI request field is three bits and reporting of A-CSI from the user terminal 10 is not requested, "000" is set in the CSI request field, and when reporting of A-CSI from the user terminal 10 is requested, "001," "010," "011," "100," "101," "110" or "111" is set depending on the combination of radio base station apparatuses 10 to which A-CSI should be reported from the user terminal 10 (see FIG. 7).

Also, the uplink shared data channel control information may include, for example, an RA flag, the number of resource blocks determined per user terminal and allocation information to show the resource block positions, the modulation scheme, the coding rate, the redundancy version, an identifier to identify between new data and reconstructed data, a PUSCH transmission power control command, a cyclic shift for a demodulation reference signal (CS for DMRS), a CQI request, an A-SRSF, a PMI/RI, and so on.

Also, the baseband signal processing section 204 has a downlink shared control channel control information generating section 307 that generates downlink shared control channel control information, which is downlink control information that is common between users.

Also, the baseband signal processing section 204 has channel coding sections 308 and modulation sections 309 to support the maximum number of users to multiplex, N, in one component carrier. The channel coding sections 308 perform channel coding of control information that is generated in the downlink control information generating sections 306 and the downlink shared channel control information generating section 307, on a per user basis. The modulation sections 309 modulate the downlink control information after channel coding.

Also, the baseband signal processing section 204 has channel coding sections 312 which perform channel coding of generated uplink shared data channel control information, on a per user basis, and modulation sections 313 which modulate the uplink shared data channel control information after channel coding, on a per user basis.

The reference signal generating section 318 multiplexes cell-specific reference signals (CRSs), which are used for various purposes such as channel estimation, symbol synchronization, CQI measurement, mobility measurement and so on, by FDM/TDM, in resource blocks (RBs), and transmits these signals. Also, the reference signal generating section 318 transmits downlink demodulation reference signals (UE-specific RSs).

The downlink control information and uplink control information that are modulated in the modulation sections 309 and 313 on a per user basis are multiplexed in the control channel multiplexing section 314 and are furthermore interleaved in the interleaving section 315. A control signal that is output from the interleaving section 315 and user data that is output from the mapping section 305 are input in an IFFT section 316 as downlink channel signals. Also, a downlink reference signal is input in the IFFT section 316. The IFFT section 316 performs an inverse fast Fourier transform of the downlink channel signal and the downlink reference signal and converts frequency domain signals into time domain signals. A cyclic prefix inserting section 317 inserts cyclic prefixes in the time sequence signal of the downlink channel signal. Note that a cyclic prefix functions as a guard interval for cancelling the differences in multipath propagation delay. Transmission data to which cyclic prefixes have been added is transmitted to a transmitting/receiving section 203.

Figure 13:
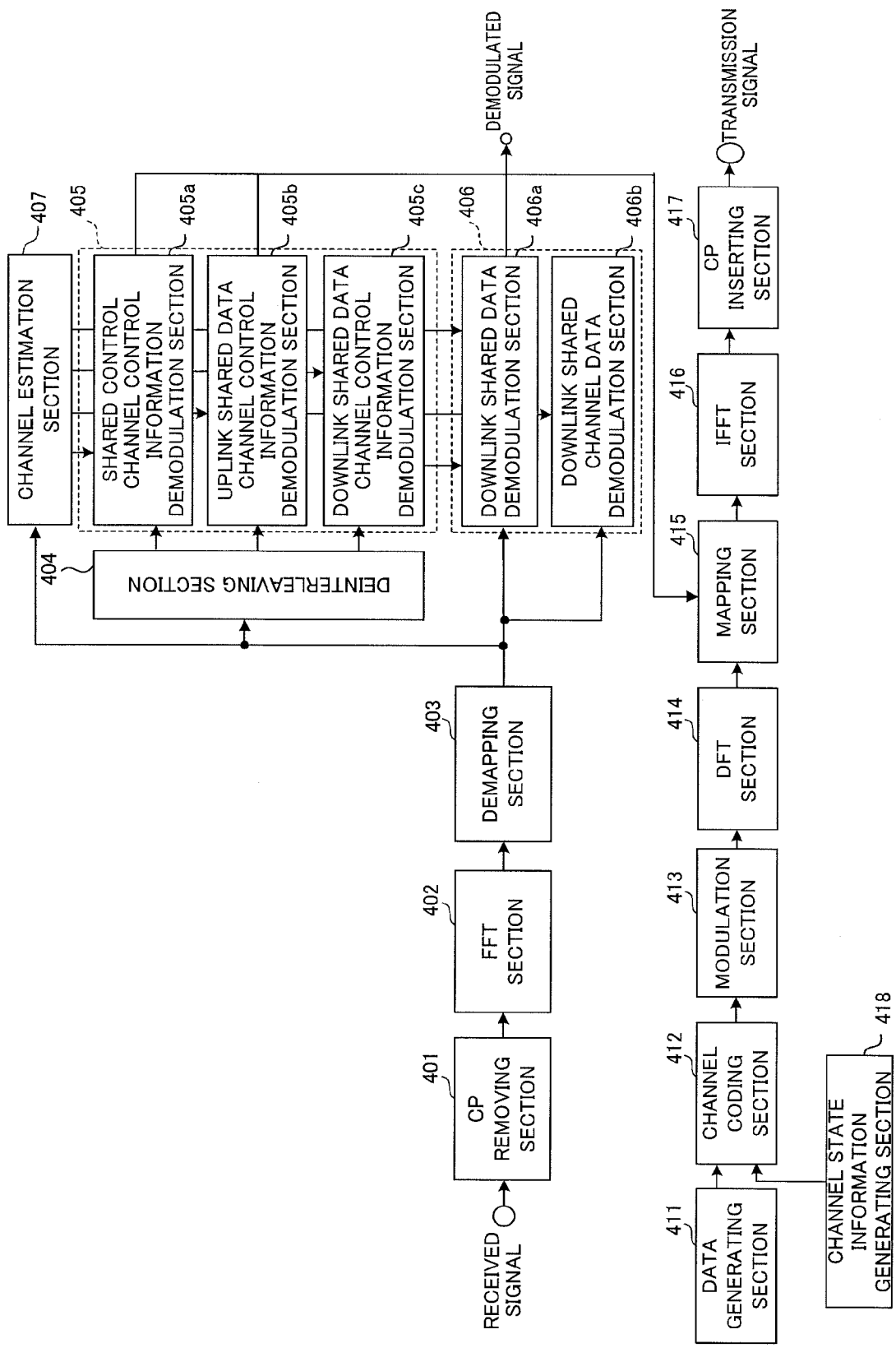
FIG. 13 is a functional block diagram of a baseband processing section provided in a user terminal according to an embodiment of the present invention.

FIG. 13 is a functional block diagram of a baseband signal processing section 104 provided in the user terminal 10, and shows the functional blocks of an LTE-A terminal which supports LTE-A. Note that the user terminal 10 is configured to be able to perform radio communication using a plurality of serving cells of different component carriers (CCs).

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403. The demapping section 403 demaps the downlink signal, and extracts, from the downlink signal, multiplex control information in which a plurality of pieces of control information are multiplexed, user data and higher control signal. Note that the demapping process by the demapping section 403 is performed based on higher layer signaling that are received as input from an application section 105. The multiplex control information that is output from the demapping section 403 is deinterleaved in a deinterleaving section 404.

Also, the baseband signal processing section 104 has a control information demodulation section 405 that demodulates downlink/uplink control information, a data demodulating section 406 that demodulates downlink shared data, and a channel estimation section 407.

The control information demodulation section 405 has a shared control channel control information demodulation section 405a that demodulates downlink shared control channel control information from the downlink control channel, an uplink shared data channel control information demodulation section 405b that performs blind decoding of the search space from the downlink control channel and demodulates uplink shared data channel control information, and a downlink shared data channel control information demodulation section 405c that performs blind decoding of the search space from the downlink control channel and demodulates downlink shared data channel control information.

The data demodulation section 406 includes a downlink shared data demodulation section 406a that demodulates the user data and higher control signal, and a downlink shared channel data demodulation section 406b that demodulates downlink shared channel data.

The shared control channel control information demodulation section 405a extracts shared control channel control information, which is control information that is common between users, by a blind decoding process of the common search space of the downlink control channel (PDCCH), a demodulation process, a channel decoding process and so on.

The shared control channel control information includes downlink channel quality information (CQI), is input in a mapping section 415, and is mapped as part of transmission data for the radio base station apparatus 20.

The uplink shared data channel control information demodulation section 405b extracts user-specific uplink shared data channel control information (for example, a UL grant) by, for example, a blind decoding process of the user-specific search space of the downlink control channel (PDCCH), a demodulation process, a channel decoding process and so on. In particular, the uplink shared data channel control information demodulation section 405b extracts identification that identifies a radio base station apparatus 20 to which A-CSI should be reported, among a plurality of radio base station apparatuses 20 #0 to #2 constituting the CoMP set. The demodulated uplink shared data channel control information is input in the mapping section 415 and used to control the uplink shared data channel (PDSCH).

The downlink shared data channel control information demodulation section 405c extracts user-specific downlink shared data channel control information (for example, a DL grant) by, for example, a blind decoding process of the user-specific search space of the downlink control channel (PDCCH), a demodulation process, and a channel decoding process. The demodulated downlink shared data channel control information is input in the downlink shared data demodulation section 406 and used to control the downlink shared data channel (PDSCH).

The downlink shared data modulation section 406a acquires user data and higher control information based on downlink shared data channel control information that is input from the downlink shared data channel control information demodulation section 405c. For example, the higher control signal acquired in the downlink shared data demodulating section 406a include, for example, the definition of the bit information constituting the CSI request field shown in FIG. 6 to FIG. 8, and parameters that identify subframes and radio resources to allocate periodic channel state information with respect to a specific radio base station apparatus 20 among a plurality of radio base station apparatuses 20 that perform CoMP transmission/reception. The higher control information is output to a channel estimation section 407. The downlink shared channel data demodulation section 406b demodulates downlink shared channel data based on the uplink shared data channel control information that is input from the uplink shared data channel control information demodulation section 405b.

The channel estimation section 407 constitutes an estimating section that estimates the channel state that should be reported to the radio base station apparatus. The channel estimation section 407 performs channel estimation using user terminal-specific reference signals or common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. In these demodulation sections, demodulation processes are performed using the estimated channel variation and the demodulation reference signals.

The baseband signal processing section 104 has, as functions blocks of the transmission system, a data generating section 411, a channel coding section 412, a modulation section 413, a DFT section 414, a mapping section 415, an IFFT section 416, a CP inserting section 417, and a channel state information generating section 418.

The data generating section 411 generates transmission data from bit data that is received as input from the application section 105. The channel coding section 412 performs a channel coding processes such as error correction to the transmission data, and the modulation section 413 modulates the transmission data after the channel coding by QPSK and so on. The DFT section 414 performs a discrete Fourier transform of the modulated transmission data. The mapping section 415 maps the frequency components of the data symbols after the DFT to subcarrier positions designated by the radio base station apparatus 20. The IFFT section 416 converts the input data, which corresponds to the system band, into time sequence data, by performing an inverse fast Fourier transform, and the CP inserting section 417 inserts cyclic prefixes in the time sequence data, in data units.

The channel state information generating section 418 generates aperiodic channel state information by that channel information measurement reference signal (CSI-RS), based on the UL grant demodulated in the uplink shared data channel control information demodulation section 405b. The channel information generating section 418 generates A-CSI when the CSI request field of the UL grant requests reporting of aperiodic channel state information (A-CSI). In particular, when a plurality of radio base station apparatuses eNBs perform CoMP transmission/reception, the channel information generating section 418 generates A-CSI with respect to a radio base station apparatus eNB, using, for example, the CSI-RS associated with that radio base station apparatus eNB designated by the combination of the CSI trigger field.

For example, when the CSI request field is two bits (see, for example, FIG. 6A), the channel information generating section 418 does not generate A-CSI if the CSI request field value is "00," and, on the other hand, if the CSI request field value is "01," generates A-CSI with respect to radio base station apparatus 20 #0 of the first set, generates A-CSI with respect to radio base station apparatus 20 #1 of the second set if the CSI request field value is "10," and generates A-CSI with respect to radio base station apparatus 20 #2 of the third set if the CSI request field value is "11."

The channel state information that is generated by the channel information generating section 418 is subject to the channel coding process by the channel coding section 412, the modulation process by the modulation section 413, and the discrete Fourier transform by the DFT section 414, and is input in the mapping section 415. Then, the channel state information is mapped to the uplink shared data channel (PUSCH) by the mapping section 415. Note that the radio base station apparatus 20 to be allocated to each CSI request field value is reported in advance from the radio base station 20 to the user terminal 10 by higher layer signaling (for example, RRC signaling).

In this way, in a radio communication system where the channel state information reporting method according to the present embodiment is applied, when coordinated multiple-point (CoMP) transmission/reception is performed, a UL grant including a request field that requests reporting of aperiodic channel state information from a user terminal 10 and an identification field that identifies a radio base station apparatus 20 to which the aperiodic channel state information should be reported, is reported to the user terminal 10 via a downlink control channel (PDCCH). By this means, it is possible to designate a radio base station apparatus 20, to which aperiodic channel state information should be reported, by the UL grant, so that it is possible to adequately feedback the conditions of communication between each radio base station apparatus 20 and the user terminal 10 such as the interference level, to a targeted radio base station apparatus 20. By this means, it is possible to effectively execute coordinated multiple-point transmission/reception between a plurality of radio base station apparatuses 20 included in a CoMP set.

Also, in a radio communication system where the channel state information reporting method according to the present embodiment is applied, parameters for designating subframes to allocate periodic channel state information with respect to a specific radio base station apparatus 20, among a plurality of radio base station apparatuses 20 that perform coordinated multiple-point (CoMP) transmission/reception, are transmitted by higher layer signaling. By this means, it is possible to adequately feedback the conditions of communication between each radio base station apparatus 20 and the user terminal 10 such as the interference level, to a targeted radio base station apparatus 20, so that it is possible to effectively execute coordinated multiple-point transmission/reception between a plurality of radio base station apparatuses 20 included in a CoMP set.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2011-103171, filed on May 2, 2011, including the specification, drawings and abstract, is incorporated herein by reference in its entirety.

The invention claimed is:

1. A CSI (channel state information) reporting method comprising the steps of:
   transmitting, to a user terminal via a downlink control channel, an uplink scheduling grant including a CSI request field to control aperiodic CSI reporting;
   by the user terminal which stores a first table defining whether or not to request aperiodic CSI reporting from the user terminal and which cell of a plurality of cells to report aperiodic CSI and a second table different from the first table defining whether or not to request aperiodic CSI reporting from the user terminal and which radio base station apparatus of a plurality of radio base station apparatuses that perform coordinated multiple-point (CoMP) transmission to report aperiodic CSI, generating CSI by using the first table or the second table based on the CSI request field and a transmission mode; and
   reporting, by the user terminal, the CSI via an uplink shared channel,
   wherein, when the transmission mode is a CoMP mode, the user terminal which stores the first table and the second table generates the CSI by using the second table based on the CSI request field,
   wherein at least one bit value in the CSI request field in the first table indicates that the aperiodic CSI should be reported of at least one cell that is designated as a first set by higher layer signaling, and
   wherein at least one bit value in the CSI request field in the second table indicates that the aperiodic CSI should be reported of at least one radio base station apparatus that is designated as a first set by higher layer signaling.

2. The CSI reporting method according to claim 1, wherein the CSI request field is two-bit information.

3. The CSI reporting method according to claim 2, wherein
   a first value of the CSI request field indicates that the aperiodic CSI reporting is not requested,
   a second value of the CSI request field indicates that the aperiodic CSI should be reported of at least one radio base station apparatus that is designated as a first set by higher layer signaling, and
   a third value of the CSI request field indicates that the aperiodic CSI should be reported of at least one radio base station apparatus that is designated as a second set by higher layer signaling.

4. The CSI reporting method according to claim 1, wherein the uplink scheduling grant is DCI format 0 or 4.

5. The CSI reporting method according to claim 1, wherein when the transmission mode is a mode other than the CoMP mode, the user terminal generates the CSI by using the first table based on the CSI request field.

6. A radio base station apparatus comprising:
   a generating section that generates an uplink scheduling grant including a CSI (channel state information) request field by using a first table defining whether or not to request aperiodic CSI reporting from a user terminal and which cell of a plurality of cells to report aperiodic CSI or a second table different from the first table defining whether or not to request aperiodic CSI reporting from the user terminal and which radio base station apparatus of a plurality of radio base station apparatuses that perform coordinated multiple-point (CoMP) transmission to report aperiodic CSI; and
   a transmission section that transmits the uplink scheduling grant to the user terminal, via a downlink control channel and transmits information about a transmission mode by higher layer signaling,
   wherein when the transmission mode is a CoMP mode, the generating section sets a value of the CSI request field by using the second table,
   wherein at least one bit value in the CSI request field in the first table indicates that the aperiodic CSI should be reported of at least one cell that is designated as a first set by higher layer signaling, and
   wherein at least one bit value in the CSI request field in the second table indicates that the aperiodic CSI should be reported of at least one radio base station apparatus that is designated as a first set by higher layer signaling.

7. The radio base station apparatus according to claim 6, wherein the CSI request field is two-bit information.

8. The radio base station apparatus according to claim 7, wherein
   a first value of the CSI request field indicates that the aperiodic CSI reporting is not requested,
   a second value of the CSI request field indicates that the aperiodic CSI should be reported of at least one radio base station apparatus that is designated as a first set by higher layer signaling, and
   a third value of the CSI request field indicates that the aperiodic CSI should be reported of at least one radio base station apparatus that is designated as a second set by higher layer signaling.

9. The radio base station apparatus according to claim 6, wherein the uplink scheduling grant is DCI format 0 or 4.

10. The radio base station apparatus according to claim 6, wherein when the transmission mode is a mode other than the CoMP mode, the generating section sets a value of the CSI request field by using the first table.

11. A user terminal comprising:
    a receiving section that receives, via a downlink control channel, an uplink scheduling grant including a CSI (channel state information) request field to control aperiodic CSI reporting;
    a storage section that stores a first table defining whether or not to request aperiodic CSI reporting from the user terminal and which cell of a plurality of cells to report aperiodic CSI and a second table different from the first table defining whether or not to request aperiodic CSI reporting from the user terminal and which radio base station apparatus of a plurality of radio base station apparatuses that perform coordinated multiple-point (COMP) transmission to report aperiodic CSI;
    a generating section that generates CSI by using the first table or the second table based on the CSI request field and a transmission mode; and
    a transmission section that reports the CSI via an uplink shared channel,
    wherein the generating section generates the CSI by using the CSI request field and the second table when the transmission mode is a CoMP mode,
    wherein at least one bit value in the CSI request field in the first table indicates that the aperiodic CSI should be reported of at least one cell that is designated as a first set by higher layer signaling, and
    wherein at least one bit value in the CSI request field in the second table indicates that the aperiodic CSI should be reported of at least one radio base station apparatus that is designated as a first set by higher layer signaling.

12. The user terminal according to claim 11, wherein when the transmission mode is a mode other than the CoMP mode, the generating section generates the CSI by using the first table based on the CSI request field.

13. A radio communication system comprising:

a radio base station apparatus that transmits, to a user terminal via a downlink control channel, an uplink scheduling grant including a CSI (channel state information) request field to control aperiodic CSI reporting; and the user terminal that stores a first table defining whether or not to request aperiodic CSI reporting from the user terminal and which cell of a plurality of cells to report aperiodic CSI and a second table different from the first table defining whether or not to request aperiodic CSI reporting from the user terminal and which radio base station apparatus of a plurality of radio base station apparatuses that perform coordinated multiple-point (CoMP) transmission to report aperiodic CSI, generates CSI by using the first table or the second table based on the CSI request field and a transmission mode and reports the CSI via an uplink shared channel, wherein, when the transmission mode is a CoMP mode, the user terminal which stores the first table and the second table generates the CSI by using the second table based on the CSI request field, wherein at least one bit value in the CSI request field in the first table indicates that the aperiodic CSI should be reported of at least one cell that is designated as a first set by higher layer signaling, and wherein at least one bit value in the CSI request field in the second table indicates that the aperiodic CSI should be reported of at least one radio base station apparatus that is designated as a first set by higher layer signaling.

14. The radio communication system according to claim 13, wherein when the transmission mode is a mode other than the CoMP mode, the user terminal generates CSI by using the first table based on the CSI request field.

* * * * *